(12) United States Patent
Hadzidedic

(10) Patent No.: US 8,295,981 B2
(45) Date of Patent: Oct. 23, 2012

(54) DEVICE COMMISSIONING IN A HEATING, VENTILATION AND AIR CONDITIONING NETWORK

(75) Inventor: Darko Hadzidedic, Plano, TX (US)

(73) Assignee: Lennox Industries Inc., Richardson, TX (US)

( * ) Notice: Subject to any disclaimer, the term of this patent is extended or adjusted under 35 U.S.C. 154(b) by 399 days.

(21) Appl. No.: 12/603,527

(22) Filed: Oct. 21, 2009

(65) Prior Publication Data
US 2010/0106321 A1 Apr. 29, 2010

Related U.S. Application Data

(63) Continuation-in-part of application No. 12/258,659, filed on Oct. 27, 2008.

(60) Provisional application No. 61/167,135, filed on Apr. 6, 2009.

(51) Int. Cl.
*G05D 23/00* (2006.01)
*G06F 15/177* (2006.01)
(52) U.S. Cl. .................................. 700/276; 709/220
(58) Field of Classification Search .......... 700/276–278; 709/220–222; 713/1, 2, 100; 715/733–737
See application file for complete search history.

(56) References Cited

U.S. PATENT DOCUMENTS

| | | | |
|---|---|---|---|
| 4,296,464 A | 10/1981 | Woods et al. | |
| 4,501,125 A | 2/1985 | Han | |
| 4,694,394 A | 9/1987 | Costantini | |
| 4,698,628 A | 10/1987 | Herkert et al. | |
| 4,703,325 A | 10/1987 | Chamberlin et al. | |
| 4,706,247 A | 11/1987 | Yoshioka | |
| 4,723,239 A | 2/1988 | Schwartz | |
| 4,841,450 A | 6/1989 | Fredriksson | |
| 4,873,649 A | 10/1989 | Grald et al. | |
| 4,884,214 A | 11/1989 | Parker et al. | |
| 4,887,262 A | 12/1989 | van Veldhuizen | |
| 4,888,728 A | 12/1989 | Shirakawa et al. | |
| 4,889,280 A | 12/1989 | Grald et al. | |
| 4,931,948 A | 6/1990 | Parker et al. | |
| 4,941,143 A | 7/1990 | Twitty et al. | |
| 4,942,613 A | 7/1990 | Lynch | |
| 4,947,484 A | 8/1990 | Twitty et al. | |
| 4,947,928 A | 8/1990 | Parker et al. | |
| 4,953,083 A | 8/1990 | Takata et al. | |
| 4,955,018 A | 9/1990 | Twitty et al. | |
| 4,978,896 A | 12/1990 | Shah | |
| 4,991,770 A | 2/1991 | Bird et al. | |
| 4,996,513 A | 2/1991 | Mak et al. | |
| 5,006,827 A | 4/1991 | Brueton et al. | |
| 5,018,138 A | 5/1991 | Twitty et al. | |
| 5,042,997 A | 8/1991 | Rhodes | |
| 5,058,388 A | 10/1991 | Shaw et al. | |
| 5,103,896 A | 4/1992 | Saga | |
| 5,105,366 A | 4/1992 | Beckey | |
| 5,115,967 A | 5/1992 | Wedekind | |
| 5,180,102 A | 1/1993 | Gilbert et al. | |
| 5,181,653 A | 1/1993 | Foster et al. | |

(Continued)

*Primary Examiner* — M. N. Von Buhr

(57) ABSTRACT

The disclosure provides various systems and methods for conveying information between a communicating first device and a second coupled device of a HVAC network. In various embodiments, a checking of a subnet of the HVAC network for both communicating device and a non-communicating device by the communicating first device occurs. It is determined whether the second coupled device in a non-communicating device. An installer is allowed to set parameters of the non-communicating device through employment of a manifest list of features used by the non-communicating device that is accessible by the communicating device.

14 Claims, 19 Drawing Sheets

U.S. PATENT DOCUMENTS

| | | | |
|---|---|---|---|
| 5,184,122 A | 2/1993 | Decious et al. |
| 5,191,643 A | 3/1993 | Alsenz |
| 5,195,327 A | 3/1993 | Kim |
| 5,197,666 A | 3/1993 | Wedekind |
| 5,197,668 A | 3/1993 | Ratz et al. |
| 5,203,497 A | 4/1993 | Ratz et al. |
| 5,220,260 A | 6/1993 | Schuler |
| 5,230,482 A | 7/1993 | Ratz et al. |
| 5,276,630 A | 1/1994 | Baldwin et al. |
| 5,277,036 A | 1/1994 | Dieckmann et al. |
| 5,279,458 A | 1/1994 | DeWolf et al. |
| 5,297,143 A | 3/1994 | Fridrich et al. |
| 5,314,004 A | 5/1994 | Strand et al. |
| 5,323,385 A | 6/1994 | Jurewicz et al. |
| 5,323,619 A | 6/1994 | Kim |
| 5,327,426 A | 7/1994 | Dolin, Jr. et al. |
| 5,329,991 A | 7/1994 | Mehta et al. |
| 5,337,952 A | 8/1994 | Thompson |
| 5,355,323 A | 10/1994 | Bae |
| 5,383,116 A | 1/1995 | Lennartsson |
| 5,384,697 A | 1/1995 | Pascucci |
| 5,414,337 A | 5/1995 | Schuler |
| 5,417,368 A | 5/1995 | Jeffery et al. |
| 5,420,572 A | 5/1995 | Dolin, Jr. et al. |
| 5,440,895 A | 8/1995 | Bahel et al. |
| 5,444,626 A | 8/1995 | Schenk |
| 5,444,851 A | 8/1995 | Woest |
| 5,448,180 A | 9/1995 | Kienzler et al. |
| 5,448,561 A | 9/1995 | Kaiser et al. |
| 5,449,047 A | 9/1995 | Schivley, Jr. |
| 5,452,201 A | 9/1995 | Pieronek et al. |
| 5,460,327 A | 10/1995 | Hill et al. |
| 5,463,735 A | 10/1995 | Pascucci et al. |
| 5,469,150 A | 11/1995 | Sitte |
| 5,481,661 A | 1/1996 | Kobayashi |
| 5,488,834 A | 2/1996 | Schwarz |
| 5,491,649 A | 2/1996 | Friday, Jr. et al. |
| 5,502,818 A | 3/1996 | Lamberg |
| 5,513,324 A | 4/1996 | Dolin, Jr. et al. |
| 5,515,267 A | 5/1996 | Alsenz |
| 5,520,328 A | 5/1996 | Bujak, Jr. |
| 5,530,643 A | 6/1996 | Hodorowski |
| 5,537,339 A | 7/1996 | Naganuma et al. |
| 5,539,778 A | 7/1996 | Kienzler et al. |
| 5,544,036 A | 8/1996 | Brown, Jr. et al. |
| 5,544,809 A | 8/1996 | Keating et al. |
| 5,551,053 A | 8/1996 | Nadolski et al. |
| 5,555,269 A | 9/1996 | Friday, Jr. et al. |
| 5,555,509 A | 9/1996 | Dolan et al. |
| 5,559,407 A | 9/1996 | Dudley et al. |
| 5,559,412 A | 9/1996 | Schuler |
| 5,566,879 A | 10/1996 | Longtin |
| 5,572,658 A | 11/1996 | Mohr et al. |
| 5,574,848 A | 11/1996 | Thomson |
| 5,579,221 A | 11/1996 | Mun |
| 5,581,478 A | 12/1996 | Cruse et al. |
| 5,592,058 A | 1/1997 | Archer et al. |
| 5,592,059 A | 1/1997 | Archer |
| 5,592,628 A | 1/1997 | Ueno et al. |
| 5,596,437 A | 1/1997 | Heins |
| 5,598,566 A | 1/1997 | Pascucci et al. |
| 5,600,782 A | 2/1997 | Thomson |
| 5,613,369 A | 3/1997 | Sato et al. |
| 5,617,282 A | 4/1997 | Rall et al. |
| 5,628,201 A | 5/1997 | Bahel et al. |
| 5,630,325 A | 5/1997 | Bahel et al. |
| 5,634,590 A | 6/1997 | Gorski et al. |
| 5,675,830 A | 10/1997 | Satula |
| 5,684,717 A | 11/1997 | Beilfuss et al. |
| 5,699,243 A | 12/1997 | Eckel et al. |
| 5,711,480 A | 1/1998 | Zepke et al. |
| 5,720,604 A | 2/1998 | Kelly et al. |
| 5,722,822 A | 3/1998 | Wilson et al. |
| 5,726,900 A | 3/1998 | Walter et al. |
| 5,737,529 A | 4/1998 | Dolin, Jr. et al. |
| 5,748,923 A | 5/1998 | Eitrich |
| 5,751,572 A | 5/1998 | Maciulewicz |
| 5,751,948 A | 5/1998 | Dolan et al. |
| 5,754,779 A | 5/1998 | Dolin, Jr. et al. |
| 5,761,083 A | 6/1998 | Brown, Jr. et al. |
| 5,764,146 A | 6/1998 | Baldwin et al. |
| 5,772,326 A | 6/1998 | Batko et al. |
| 5,772,732 A | 6/1998 | James et al. |
| 5,774,322 A | 6/1998 | Walter et al. |
| 5,774,492 A | 6/1998 | Orlowski, Jr. et al. |
| 5,774,493 A | 6/1998 | Ross |
| 5,777,837 A | 7/1998 | Eckel et al. |
| 5,782,296 A | 7/1998 | Mehta |
| 5,786,993 A | 7/1998 | Frutiger et al. |
| 5,787,027 A | 7/1998 | Dolan et al. |
| 5,791,332 A | 8/1998 | Thompson et al. |
| 5,802,485 A | 9/1998 | Koelle et al. |
| 5,809,063 A | 9/1998 | Ashe et al. |
| 5,809,556 A | 9/1998 | Fujisawa et al. |
| 5,816,492 A | 10/1998 | Charles et al. |
| 5,818,347 A | 10/1998 | Dolan et al. |
| 5,819,845 A | 10/1998 | Ryu et al. |
| 5,826,038 A | 10/1998 | Nakazumi |
| 5,829,674 A | 11/1998 | Vanostrand et al. |
| 5,841,654 A | 11/1998 | Verissimo et al. |
| 5,848,887 A | 12/1998 | Zabielski et al. |
| 5,854,744 A | 12/1998 | Zeng et al. |
| 5,856,972 A | 1/1999 | Riley et al. |
| 5,860,411 A | 1/1999 | Thompson et al. |
| 5,860,473 A | 1/1999 | Seiden |
| 5,862,411 A | 1/1999 | Kay et al. |
| 5,864,581 A | 1/1999 | Alger-Meunier et al. |
| 5,873,519 A | 2/1999 | Beilfuss |
| 5,878,236 A | 3/1999 | Kleineberg et al. |
| 5,883,627 A | 3/1999 | Pleyer |
| 5,892,690 A | 4/1999 | Boatman et al. |
| 5,896,304 A | 4/1999 | Tiemann et al. |
| 5,900,674 A | 5/1999 | Wojnarowski et al. |
| 5,903,454 A | 5/1999 | Hoffberg et al. |
| 5,912,877 A | 6/1999 | Shirai et al. |
| 5,914,453 A | 6/1999 | James et al. |
| 5,915,101 A | 6/1999 | Kleineberg et al. |
| 5,927,398 A | 7/1999 | Maciulewicz |
| 5,930,249 A | 7/1999 | Stademann et al. |
| 5,933,655 A | 8/1999 | Vrabec et al. |
| 5,934,554 A | 8/1999 | Charles et al. |
| 5,937,942 A | 8/1999 | Bias et al. |
| 5,946,209 A | 8/1999 | Eckel et al. |
| 5,971,597 A | 10/1999 | Baldwin et al. |
| 5,973,594 A | 10/1999 | Baldwin et al. |
| 5,983,646 A | 11/1999 | Grothe et al. |
| 5,993,195 A | 11/1999 | Thompson |
| 6,006,142 A | 12/1999 | Seem et al. |
| 6,011,821 A | 1/2000 | Sauer et al. |
| 6,021,252 A | 2/2000 | Faris et al. |
| 6,028,864 A | 2/2000 | Marttinen et al. |
| 6,032,178 A | 2/2000 | Bacigalupo et al. |
| 6,035,024 A | 3/2000 | Stumer |
| 6,046,410 A | 4/2000 | Wojnarowski et al. |
| 6,049,817 A | 4/2000 | Schoen et al. |
| 6,053,416 A | 4/2000 | Specht et al. |
| 6,061,603 A | 5/2000 | Papadopoulos et al. |
| 6,078,660 A | 6/2000 | Burgess |
| 6,082,894 A | 7/2000 | Batko et al. |
| 6,092,280 A | 7/2000 | Wojnarowski |
| 6,095,674 A | 8/2000 | Verissimo et al. |
| 6,098,116 A | 8/2000 | Nixon et al. |
| 6,101,824 A | 8/2000 | Meyer et al. |
| 6,110,260 A | 8/2000 | Kubokawa |
| 6,138,227 A | 10/2000 | Thewes et al. |
| 6,141,595 A | 10/2000 | Gloudeman et al. |
| 6,145,501 A | 11/2000 | Manohar et al. |
| 6,145,751 A | 11/2000 | Ahmed |
| 6,147,601 A | 11/2000 | Sandelman et al. |
| 6,151,298 A | 11/2000 | Bernhardsson et al. |
| 6,151,529 A | 11/2000 | Batko |
| 6,151,625 A | 11/2000 | Swales et al. |
| 6,151,650 A | 11/2000 | Birzer |
| 6,155,341 A | 12/2000 | Thompson et al. |
| 6,160,477 A | 12/2000 | Sandelman et al. |
| 6,160,484 A | 12/2000 | Spahl et al. |
| 6,160,795 A | 12/2000 | Hosemann |

| | | | | | | |
|---|---|---|---|---|---|---|
| 6,167,338 A | 12/2000 | De Wille et al. | | 6,587,739 B1 | 7/2003 | Abrams et al. |
| 6,169,937 B1 | 1/2001 | Peterson | | 6,587,884 B1 | 7/2003 | Papadopoulos et al. |
| 6,177,945 B1 | 1/2001 | Pleyer | | 6,595,430 B1 | 7/2003 | Shah |
| 6,179,213 B1 | 1/2001 | Gibino et al. | | 6,600,923 B1 | 7/2003 | Dzuban |
| 6,182,130 B1 | 1/2001 | Dolin, Jr. et al. | | 6,608,560 B2 | 8/2003 | Abrams |
| 6,188,642 B1 | 2/2001 | Schoniger et al. | | 6,609,127 B1 | 8/2003 | Lee et al. |
| 6,190,442 B1 | 2/2001 | Redner | | 6,615,088 B1 | 9/2003 | Myer et al. |
| 6,208,905 B1 | 3/2001 | Giddings et al. | | 6,615,594 B2 | 9/2003 | Jayanth et al. |
| 6,208,924 B1 | 3/2001 | Bauer | | 6,618,394 B1 | 9/2003 | Hilleary |
| 6,211,782 B1 | 4/2001 | Sandelman et al. | | 6,619,555 B2 | 9/2003 | Rosen |
| 6,216,066 B1 | 4/2001 | Goebel et al. | | 6,621,507 B1 | 9/2003 | Shah |
| 6,227,191 B1 | 5/2001 | Garloch | | 6,622,926 B1 | 9/2003 | Sartain et al. |
| 6,232,604 B1 | 5/2001 | McDaniel et al. | | 6,628,993 B1 | 9/2003 | Bauer |
| 6,237,113 B1 | 5/2001 | Daiber | | 6,633,781 B1 | 10/2003 | Lee et al. |
| 6,252,890 B1 | 6/2001 | Alger-Meunier et al. | | 6,636,771 B1 | 10/2003 | Varma et al. |
| 6,254,009 B1 | 7/2001 | Proffitt et al. | | 6,640,145 B2 | 10/2003 | Hoffberg et al. |
| 6,266,205 B1 | 7/2001 | Schreck et al. | | 6,640,890 B1 | 11/2003 | Dage et al. |
| 6,269,127 B1 | 7/2001 | Richards | | 6,643,689 B2 | 11/2003 | Rode et al. |
| 6,282,454 B1 | 8/2001 | Papadopoulos et al. | | 6,647,317 B2 | 11/2003 | Takai et al. |
| 6,285,912 B1 | 9/2001 | Ellison et al. | | 6,650,949 B1 | 11/2003 | Fera et al. |
| 6,292,518 B1 | 9/2001 | Grabb et al. | | 6,651,034 B1 | 11/2003 | Hedlund et al. |
| 6,298,376 B1 | 10/2001 | Rosner et al. | | 6,658,373 B2 | 12/2003 | Rossi et al. |
| 6,298,454 B1 | 10/2001 | Schleiss et al. | | RE38,406 E | 1/2004 | Faris et al. |
| 6,298,551 B1 | 10/2001 | Wojnarowski et al. | | 6,681,215 B2 | 1/2004 | Jammu |
| 6,304,557 B1 | 10/2001 | Nakazumi | | 6,688,387 B1 | 2/2004 | Wellington et al. |
| 6,324,008 B1 | 11/2001 | Baldwin et al. | | 6,704,688 B2 | 3/2004 | Aslam et al. |
| 6,324,854 B1 | 12/2001 | Jayanth | | 6,708,239 B1 | 3/2004 | Ellerbrock et al. |
| 6,336,065 B1 | 1/2002 | Gibson et al. | | 6,715,120 B1 | 3/2004 | Hladik et al. |
| 6,343,236 B1 | 1/2002 | Gibson et al. | | 6,715,302 B2 | 4/2004 | Ferragut, II |
| 6,349,306 B1 * | 2/2002 | Malik et al. .................. 707/779 | | 6,715,690 B2 | 4/2004 | Hull et al. |
| 6,349,883 B1 | 2/2002 | Simmons et al. | | 6,717,513 B1 | 4/2004 | Sandelman et al. |
| 6,353,775 B1 | 3/2002 | Nichols | | 6,718,384 B2 | 4/2004 | Linzy |
| 6,385,510 B1 | 5/2002 | Hoog et al. | | 6,722,143 B2 | 4/2004 | Moon et al. |
| 6,390,806 B1 | 5/2002 | Dempsey et al. | | 6,725,180 B2 | 4/2004 | Mayer et al. |
| 6,393,023 B1 | 5/2002 | Shimizu et al. | | 6,725,398 B1 | 4/2004 | Varma et al. |
| 6,400,996 B1 | 6/2002 | Hoffberg et al. | | 6,728,369 B2 | 4/2004 | Burgess |
| 6,405,104 B1 | 6/2002 | Dougherty | | 6,732,191 B1 | 5/2004 | Baker et al. |
| 6,408,228 B1 | 6/2002 | Seem et al. | | 6,735,196 B1 | 5/2004 | Manzardo |
| 6,411,701 B1 | 6/2002 | Stademann | | 6,735,282 B2 | 5/2004 | Matsushita et al. |
| 6,412,435 B1 | 7/2002 | Timmons, Jr. | | 6,735,965 B2 | 5/2004 | Moon et al. |
| 6,415,395 B1 | 7/2002 | Varma et al. | | 6,738,676 B2 | 5/2004 | Hirayama |
| 6,418,507 B1 | 7/2002 | Fackler | | 6,741,915 B2 | 5/2004 | Poth |
| 6,423,118 B1 | 7/2002 | Becerra et al. | | 6,744,771 B1 | 6/2004 | Barber et al. |
| 6,424,872 B1 | 7/2002 | Glanzer et al. | | 6,745,106 B2 | 6/2004 | Howard et al. |
| 6,424,874 B1 | 7/2002 | Cofer | | 6,758,050 B2 | 7/2004 | Jayanth et al. |
| 6,429,845 B1 | 8/2002 | Unseld et al. | | 6,758,051 B2 | 7/2004 | Jayanth et al. |
| 6,434,715 B1 | 8/2002 | Andersen | | 6,763,040 B1 | 7/2004 | Hite et al. |
| 6,435,418 B1 | 8/2002 | Toth et al. | | 6,763,272 B2 | 7/2004 | Knepper |
| 6,437,691 B1 | 8/2002 | Sandelman et al. | | 6,765,993 B2 | 7/2004 | Cueman |
| 6,442,952 B2 | 9/2002 | Roh et al. | | 6,768,732 B1 | 7/2004 | Neuhaus |
| 6,448,896 B1 | 9/2002 | Bankus et al. | | 6,774,786 B1 | 8/2004 | Havekost et al. |
| 6,449,315 B2 | 9/2002 | Richards | | 6,779,176 B1 | 8/2004 | Chambers, II et al. |
| 6,450,409 B1 | 9/2002 | Rowlette et al. | | 6,783,079 B2 | 8/2004 | Carey et al. |
| 6,454,177 B1 | 9/2002 | Sasao et al. | | 6,789,739 B2 | 9/2004 | Rosen |
| 6,462,654 B1 | 10/2002 | Sandelman et al. | | 6,791,530 B2 | 9/2004 | Vernier et al. |
| 6,478,084 B1 | 11/2002 | Kumar et al. | | 6,795,935 B1 | 9/2004 | Unkle et al. |
| 6,497,570 B1 | 12/2002 | Sears et al. | | 6,798,341 B1 | 9/2004 | Eckel et al. |
| 6,498,844 B1 | 12/2002 | Stademann | | 6,801,524 B2 | 10/2004 | Eteminan |
| 6,501,995 B1 * | 12/2002 | Kinney et al. .................. 700/1 | | 6,804,564 B2 | 10/2004 | Crispin et al. |
| 6,504,338 B1 | 1/2003 | Eichorn | | 6,810,333 B2 | 10/2004 | Adedeji et al. |
| 6,526,122 B2 | 2/2003 | Matsushita et al. | | 6,814,299 B1 | 11/2004 | Carey |
| 6,535,123 B2 | 3/2003 | Sandelman et al. | | 6,814,660 B1 | 11/2004 | Cavett |
| 6,535,138 B1 | 3/2003 | Dolan et al. | | 6,816,071 B2 | 11/2004 | Conti |
| 6,539,489 B1 | 3/2003 | Reinert | | 6,819,802 B2 | 11/2004 | Higgs et al. |
| 6,540,148 B1 | 4/2003 | Salsbury et al. | | 6,822,202 B2 | 11/2004 | Atlas |
| 6,542,462 B1 | 4/2003 | Sohraby et al. | | 6,823,680 B2 | 11/2004 | Jayanth |
| 6,543,007 B1 | 4/2003 | Bliley et al. | | 6,824,069 B2 | 11/2004 | Rosen |
| 6,545,660 B1 | 4/2003 | Shen et al. | | 6,826,454 B2 | 11/2004 | Sulfstede |
| 6,546,008 B1 | 4/2003 | Wehrend | | 6,826,590 B1 | 11/2004 | Glanzer et al. |
| 6,554,198 B1 | 4/2003 | Hull et al. | | 6,832,118 B1 | 12/2004 | Heberlein et al. |
| 6,560,976 B2 | 5/2003 | Jayanth | | 6,833,844 B1 | 12/2004 | Shiota et al. |
| 6,567,476 B2 | 5/2003 | Kohl et al. | | 6,840,052 B2 | 1/2005 | Smith et al. |
| 6,572,363 B1 | 6/2003 | Virgil, Jr. et al. | | 6,842,117 B2 | 1/2005 | Keown |
| 6,574,215 B2 | 6/2003 | Hummel | | 6,842,808 B2 | 1/2005 | Weigl et al. |
| 6,574,234 B1 | 6/2003 | Myer et al. | | 6,845,918 B2 | 1/2005 | Rotondo |
| 6,574,581 B1 | 6/2003 | Bohrer et al. | | 6,850,992 B2 | 2/2005 | Heinrich et al. |
| 6,575,233 B1 | 6/2003 | Krumnow | | 6,851,948 B2 | 2/2005 | Dempsey et al. |
| 6,580,950 B1 | 6/2003 | Johnson et al. | | 6,853,291 B1 | 2/2005 | Aisa |
| 6,587,039 B1 | 7/2003 | Woestemeyer et al. | | 6,854,444 B2 | 2/2005 | Plagge et al. |

| | | |
|---|---|---|
| 6,865,449 B2 | 3/2005 | Dudley |
| 6,865,596 B1 | 3/2005 | Barber et al. |
| 6,865,898 B2 | 3/2005 | Yamanashi et al. |
| 6,866,375 B2 | 3/2005 | Leighton et al. |
| 6,868,900 B2 | 3/2005 | Dage et al. |
| 6,874,693 B2 | 4/2005 | Readio et al. |
| 6,876,891 B1 | 4/2005 | Schuler et al. |
| 6,879,881 B1 | 4/2005 | Attridge, Jr. |
| 6,888,441 B2 | 5/2005 | Carey |
| 6,892,121 B2 | 5/2005 | Schmidt |
| 6,894,703 B2 | 5/2005 | Vernier et al. |
| 6,900,808 B2 | 5/2005 | Lassiter et al. |
| 6,901,316 B1 | 5/2005 | Jensen et al. |
| 6,901,439 B1 | 5/2005 | Bonasia et al. |
| 6,907,329 B2 | 6/2005 | Junger et al. |
| 6,909,948 B2 | 6/2005 | Mollmann et al. |
| 6,918,064 B2 | 7/2005 | Mueller et al. |
| 6,920,318 B2 | 7/2005 | Brooking et al. |
| 6,925,360 B2 | 8/2005 | Yoon et al. |
| 6,931,645 B2 | 8/2005 | Murching et al. |
| 6,938,106 B2 | 8/2005 | Ellerbrock et al. |
| 6,941,193 B2 | 9/2005 | Frecska et al. |
| 6,954,680 B2 | 10/2005 | Kreidler et al. |
| 6,955,060 B2 | 10/2005 | Homan et al. |
| 6,955,302 B2 | 10/2005 | Erdman, Jr. |
| 6,956,424 B2 | 10/2005 | Hohnel |
| 6,957,696 B1 | 10/2005 | Krumnow |
| 6,963,288 B1 | 11/2005 | Sokol et al. |
| 6,963,922 B2 | 11/2005 | Papadopoulos et al. |
| 6,965,802 B2 | 11/2005 | Sexton |
| 6,968,295 B1 | 11/2005 | Carr |
| 6,973,366 B2 | 12/2005 | Komai |
| 6,975,219 B2 | 12/2005 | Eryurek et al. |
| 6,975,913 B2 | 12/2005 | Kreidler et al. |
| 6,975,958 B2 | 12/2005 | Bohrer et al. |
| 6,980,796 B1 | 12/2005 | Cuellar et al. |
| 6,981,266 B1 | 12/2005 | An et al. |
| 6,983,271 B2 | 1/2006 | Morrow et al. |
| 6,983,889 B2 | 1/2006 | Alles |
| 6,988,011 B2 | 1/2006 | Varma et al. |
| 6,988,671 B2 | 1/2006 | DeLuca |
| 6,990,381 B2 | 1/2006 | Nomura et al. |
| 6,990,540 B2 | 1/2006 | Dalakuras et al. |
| 6,993,414 B2 | 1/2006 | Shah |
| RE38,985 E | 2/2006 | Boatman et al. |
| 6,994,620 B2 | 2/2006 | Mills |
| 6,999,473 B2 | 2/2006 | Windecker |
| 6,999,824 B2 | 2/2006 | Glanzer et al. |
| 7,000,849 B2 | 2/2006 | Ashworth et al. |
| 7,003,378 B2 | 2/2006 | Poth |
| 7,006,460 B1 | 2/2006 | Vollmer et al. |
| 7,006,881 B1 | 2/2006 | Hoffberg et al. |
| 7,013,239 B2 | 3/2006 | Hedlund et al. |
| 7,017,827 B2 | 3/2006 | Shah et al. |
| 7,020,798 B2 | 3/2006 | Meng et al. |
| 7,022,008 B1 | 4/2006 | Crocker |
| 7,024,282 B2 | 4/2006 | Coogan et al. |
| 7,024,283 B2 | 4/2006 | Bicknell |
| 7,025,281 B2 | 4/2006 | DeLuca |
| 7,029,391 B2 | 4/2006 | Nagaya et al. |
| 7,032,018 B2 | 4/2006 | Lee et al. |
| 7,035,719 B2 | 4/2006 | Howard et al. |
| 7,035,898 B1 | 4/2006 | Baker |
| 7,036,743 B2 | 5/2006 | Shah |
| 7,043,339 B2 | 5/2006 | Maeda et al. |
| 7,044,397 B2 | 5/2006 | Bartlett et al. |
| 7,047,092 B2 | 5/2006 | Wimsatt |
| 7,051,282 B2 | 5/2006 | Marcjan |
| 7,058,459 B2 | 6/2006 | Weiberle et al. |
| 7,058,477 B1 | 6/2006 | Rosen |
| 7,058,693 B1 | 6/2006 | Baker, Jr. |
| 7,058,737 B2 | 6/2006 | Ellerbrock et al. |
| 7,062,927 B2 | 6/2006 | Kwon et al. |
| 7,068,612 B2 | 6/2006 | Berkcan et al. |
| 7,076,962 B2 | 7/2006 | He et al. |
| 7,082,339 B2 | 7/2006 | Murray et al. |
| 7,082,352 B2 | 7/2006 | Lim |
| 7,083,109 B2 | 8/2006 | Pouchak |
| 7,085,626 B2 | 8/2006 | Harrod et al. |
| 7,089,087 B2 | 8/2006 | Dudley |
| 7,089,088 B2 | 8/2006 | Terry et al. |
| 7,089,530 B1 * | 8/2006 | Dardinski et al. ............ 717/105 |
| 7,092,772 B2 | 8/2006 | Murray et al. |
| 7,092,794 B1 | 8/2006 | Hill et al. |
| 7,096,078 B2 | 8/2006 | Burr et al. |
| 7,096,285 B2 | 8/2006 | Ellerbrock et al. |
| 7,096,465 B1 * | 8/2006 | Dardinski et al. ............ 717/178 |
| 7,099,965 B2 | 8/2006 | Ellerbrock et al. |
| 7,100,382 B2 | 9/2006 | Butler et al. |
| 7,103,000 B2 | 9/2006 | Rode et al. |
| 7,103,016 B1 | 9/2006 | Duffy et al. |
| 7,103,420 B2 | 9/2006 | Brown et al. |
| 7,110,835 B2 | 9/2006 | Blevins et al. |
| 7,114,088 B2 | 9/2006 | Horbelt |
| 7,114,554 B2 | 10/2006 | Bergman et al. |
| 7,117,050 B2 | 10/2006 | Sasaki et al. |
| 7,117,051 B2 | 10/2006 | Landry et al. |
| 7,117,395 B2 | 10/2006 | Opaterny |
| 7,120,036 B2 | 10/2006 | Kyono |
| 7,123,428 B2 | 10/2006 | Yeo et al. |
| 7,123,774 B2 | 10/2006 | Dhavala et al. |
| 7,127,305 B1 | 10/2006 | Palmon |
| 7,130,409 B2 | 10/2006 | Beyda |
| 7,130,719 B2 | 10/2006 | Ehlers et al. |
| 7,133,407 B2 | 11/2006 | Jinzaki et al. |
| 7,133,748 B2 | 11/2006 | Robinson |
| 7,133,749 B2 | 11/2006 | Goldberg et al. |
| 7,135,982 B2 | 11/2006 | Lee |
| 7,139,550 B2 | 11/2006 | Cuellar et al. |
| 7,146,230 B2 | 12/2006 | Glanzer et al. |
| 7,146,231 B2 | 12/2006 | Schleiss et al. |
| 7,146,253 B2 | 12/2006 | Hoog et al. |
| 7,150,408 B2 | 12/2006 | DeLuca |
| 7,155,318 B2 | 12/2006 | Sharma et al. |
| 7,155,499 B2 | 12/2006 | Soemo et al. |
| 7,156,316 B2 | 1/2007 | Kates |
| 7,162,512 B1 | 1/2007 | Amit et al. |
| 7,162,883 B2 | 1/2007 | Jayanth et al. |
| 7,163,156 B2 | 1/2007 | Kates |
| 7,163,158 B2 | 1/2007 | Rossi et al. |
| 7,167,762 B2 | 1/2007 | Glanzer et al. |
| 7,168,627 B2 | 1/2007 | Kates |
| 7,171,579 B2 | 1/2007 | Weigl et al. |
| 7,172,132 B2 | 2/2007 | Proffitt et al. |
| 7,174,239 B2 | 2/2007 | Butler et al. |
| 7,174,728 B2 | 2/2007 | Jayanth |
| 7,175,086 B2 | 2/2007 | Gascoyne et al. |
| 7,175,098 B2 | 2/2007 | DeLuca |
| 7,177,926 B2 | 2/2007 | Kramer |
| 7,181,317 B2 | 2/2007 | Amundson et al. |
| 7,185,262 B2 | 2/2007 | Barthel et al. |
| 7,186,290 B2 | 3/2007 | Sheehan et al. |
| 7,187,354 B2 | 3/2007 | Min et al. |
| 7,187,986 B2 | 3/2007 | Johnson et al. |
| 7,188,002 B2 | 3/2007 | Chapman, Jr. et al. |
| 7,188,207 B2 | 3/2007 | Mitter |
| 7,188,482 B2 | 3/2007 | Sadegh et al. |
| 7,188,779 B2 | 3/2007 | Alles |
| 7,191,028 B2 | 3/2007 | Nomura et al. |
| 7,194,663 B2 | 3/2007 | Fletcher et al. |
| 7,195,211 B2 | 3/2007 | Kande et al. |
| 7,197,717 B2 | 3/2007 | Anderson et al. |
| 7,200,450 B2 | 4/2007 | Boyer et al. |
| 7,203,165 B1 | 4/2007 | Kowalewski |
| 7,203,575 B2 | 4/2007 | Maturana et al. |
| 7,203,776 B2 | 4/2007 | Junger et al. |
| 7,206,646 B2 | 4/2007 | Nixon et al. |
| 7,206,647 B2 | 4/2007 | Kumar |
| 7,209,485 B2 | 4/2007 | Guse |
| 7,209,748 B2 | 4/2007 | Wong et al. |
| 7,212,825 B2 | 5/2007 | Wong et al. |
| 7,213,044 B2 | 5/2007 | Tjong et al. |
| 7,216,016 B2 | 5/2007 | Van Ostrand et al. |
| 7,216,017 B2 | 5/2007 | Kwon et al. |
| 7,216,497 B2 | 5/2007 | Hull et al. |
| 7,218,589 B2 | 5/2007 | Wisnudel et al. |
| 7,218,996 B1 | 5/2007 | Beitelmal et al. |
| 7,219,141 B2 | 5/2007 | Bonasia et al. |

| | | | |
|---|---|---|---|
| 7,222,152 B1 | 5/2007 | Thompson et al. | |
| 7,222,493 B2 | 5/2007 | Jayanth et al. | |
| 7,222,494 B2 | 5/2007 | Peterson et al. | |
| 7,224,366 B2 | 5/2007 | Kessler et al. | |
| 7,225,054 B2 | 5/2007 | Amundson et al. | |
| 7,225,356 B2 | 5/2007 | Monitzer | |
| 7,228,187 B2 | 6/2007 | Ticky et al. | |
| 7,232,058 B2 | 6/2007 | Lee | |
| 7,233,229 B2 | 6/2007 | Stroupe et al. | |
| 7,239,623 B2 | 7/2007 | Burghardt et al. | |
| 7,242,988 B1 | 7/2007 | Hoffberg et al. | |
| 7,243,004 B2 | 7/2007 | Shah et al. | |
| 7,244,294 B2 | 7/2007 | Kates | |
| 7,246,753 B2 | 7/2007 | Hull et al. | |
| 7,248,576 B2 | 7/2007 | Hoffmann | |
| 7,251,534 B2 | 7/2007 | Walls et al. | |
| 7,257,813 B1 | 8/2007 | Mayer et al. | |
| 7,260,084 B2 | 8/2007 | Saller | |
| 7,260,451 B2 | 8/2007 | Takai et al. | |
| 7,260,609 B2 | 8/2007 | Fuehrer et al. | |
| 7,260,948 B2 | 8/2007 | Jayanth et al. | |
| 7,261,241 B2 | 8/2007 | Eoga | |
| 7,261,243 B2 | 8/2007 | Butler et al. | |
| 7,261,762 B2 | 8/2007 | Kang et al. | |
| 7,266,775 B2 | 9/2007 | Patitucci | |
| 7,266,960 B2 | 9/2007 | Shah | |
| 7,269,962 B2 | 9/2007 | Bachmann | |
| 7,272,154 B2 | 9/2007 | Loebig | |
| 7,272,452 B2 | 9/2007 | Coogan et al. | |
| 7,272,457 B2 | 9/2007 | Glanzer et al. | |
| 7,274,972 B2 | 9/2007 | Amundson et al. | |
| 7,274,973 B2 | 9/2007 | Nichols et al. | |
| 7,277,280 B2 | 10/2007 | Peng | |
| 7,277,970 B2 | 10/2007 | Ellerbrock et al. | |
| 7,278,103 B1 | 10/2007 | Clark et al. | |
| 7,287,062 B2 | 10/2007 | Im et al. | |
| 7,287,708 B2 | 10/2007 | Lucas et al. | |
| 7,287,709 B2 | 10/2007 | Proffitt et al. | |
| 7,289,458 B2 | 10/2007 | Gila et al. | |
| 7,292,900 B2 | 11/2007 | Kreidler et al. | |
| 7,293,422 B2 | 11/2007 | Parachini et al. | |
| 7,295,099 B2 | 11/2007 | Lee et al. | |
| 7,296,426 B2 | 11/2007 | Butler et al. | |
| 7,299,279 B2 | 11/2007 | Sadaghiany | |
| 7,299,996 B2 | 11/2007 | Garrett et al. | |
| 7,301,699 B2 | 11/2007 | Kanamori et al. | |
| 7,305,495 B2 | 12/2007 | Carter | |
| 7,306,165 B2 | 12/2007 | Shah | |
| 7,310,559 B2 | 12/2007 | Walko, Jr. | |
| 7,313,716 B2 | 12/2007 | Weigl et al. | |
| 7,313,923 B2 | 1/2008 | Jayanth et al. | |
| 7,315,768 B2 | 1/2008 | Dang et al. | |
| 7,317,970 B2 | 1/2008 | Pienta et al. | |
| 7,320,110 B2 | 1/2008 | Shah | |
| 7,324,874 B2 | 1/2008 | Jung | |
| 7,327,376 B2 | 2/2008 | Shen et al. | |
| 7,327,815 B1 | 2/2008 | Jurisch | |
| 7,330,512 B2 | 2/2008 | Frank et al. | |
| 7,331,191 B2 | 2/2008 | He et al. | |
| 7,334,161 B2 | 2/2008 | Williams et al. | |
| 7,336,650 B2 | 2/2008 | Franz et al. | |
| 7,337,369 B2 | 2/2008 | Barthel et al. | |
| 7,337,619 B2 | 3/2008 | Hsieh et al. | |
| 7,343,226 B2 | 3/2008 | Ehlers et al. | |
| 7,346,404 B2 | 3/2008 | Eryurek et al. | |
| 7,346,835 B1 | 3/2008 | Lobinger et al. | |
| 7,349,761 B1 | 3/2008 | Cruse | |
| 7,354,005 B2 | 4/2008 | Carey et al. | |
| 7,356,050 B2 | 4/2008 | Reindl et al. | |
| 7,359,345 B2 | 4/2008 | Chang et al. | |
| 7,360,002 B2 | 4/2008 | Brueckner et al. | |
| 7,360,370 B2 | 4/2008 | Shah et al. | |
| 7,360,717 B2 | 4/2008 | Shah | |
| 7,364,093 B2 | 4/2008 | Garozzo | |
| 7,365,812 B2 | 4/2008 | Lee | |
| 7,366,498 B2 | 4/2008 | Ko et al. | |
| 7,366,944 B2 | 4/2008 | Oshins et al. | |
| 7,370,074 B2 | 5/2008 | Alexander et al. | |
| 7,377,450 B2 | 5/2008 | Van Ostrand et al. | |
| 7,383,158 B2 | 6/2008 | Krocker et al. | |
| 7,389,150 B2 | 6/2008 | Inoue et al. | |
| 7,389,204 B2 | 6/2008 | Eryurek et al. | |
| RE40,437 E | 7/2008 | Rosen et al. | |
| 7,392,661 B2 | 7/2008 | Alles | |
| 7,395,122 B2 | 7/2008 | Kreidler et al. | |
| 7,395,137 B2 | 7/2008 | Robinson | |
| 7,403,128 B2 | 7/2008 | Scuka et al. | |
| 7,412,839 B2 | 8/2008 | Jayanth | |
| 7,412,842 B2 | 8/2008 | Pham | |
| D578,026 S | 10/2008 | Roher et al. | |
| 7,433,740 B2 | 10/2008 | Hesse et al. | |
| 7,434,744 B2 | 10/2008 | Garozzo et al. | |
| 7,436,292 B2 | 10/2008 | Rourke et al. | |
| 7,436,293 B2 | 10/2008 | Rourke et al. | |
| 7,436,296 B2 | 10/2008 | Rourke et al. | |
| 7,436,400 B2 | 10/2008 | Cheng | |
| 7,437,198 B2 | 10/2008 | Iwaki | |
| 7,441,094 B2 | 10/2008 | Stephens | |
| 7,451,937 B2 | 11/2008 | Flood et al. | |
| 7,454,269 B1 | 11/2008 | Dushane et al. | |
| 7,455,240 B2 | 11/2008 | Chapman, Jr. et al. | |
| 7,457,853 B1 * | 11/2008 | Chari et al. | 709/220 |
| 7,460,933 B2 | 12/2008 | Chapman, Jr. et al. | |
| 7,593,124 B1 * | 9/2009 | Sheng et al. | 358/1.15 |
| 8,024,054 B2 * | 9/2011 | Mairs et al. | 700/83 |
| 8,050,801 B2 * | 11/2011 | Richards et al. | 700/276 |
| 8,099,178 B2 * | 1/2012 | Mairs et al. | 700/19 |
| 8,122,110 B1 * | 2/2012 | Wilbur et al. | 709/221 |
| 8,127,060 B2 * | 2/2012 | Doll et al. | 710/104 |
| 2001/0034586 A1 | 10/2001 | Ewert et al. | |
| 2001/0048376 A1 | 12/2001 | Maeda et al. | |
| 2002/0022894 A1 | 2/2002 | Eryurek et al. | |
| 2002/0026476 A1 | 2/2002 | Miyazaki et al. | |
| 2002/0072814 A1 | 6/2002 | Schuler et al. | |
| 2002/0091784 A1 | 7/2002 | Baker et al. | |
| 2002/0123896 A1 | 9/2002 | Diez et al. | |
| 2002/0163427 A1 | 11/2002 | Eryurek et al. | |
| 2002/0190242 A1 | 12/2002 | Lillie et al. | |
| 2003/0058863 A1 | 3/2003 | Oost | |
| 2003/0078677 A1 | 4/2003 | Hull et al. | |
| 2003/0108064 A1 | 6/2003 | Bilke et al. | |
| 2003/0115177 A1 | 6/2003 | Takanabe et al. | |
| 2003/0229784 A1 | 12/2003 | Cuellar et al. | |
| 2004/0039478 A1 | 2/2004 | Kiesel et al. | |
| 2004/0088069 A1 * | 5/2004 | Singh | 700/108 |
| 2004/0095237 A1 | 5/2004 | Chen et al. | |
| 2004/0104942 A1 | 6/2004 | Weigel | |
| 2004/0107717 A1 | 6/2004 | Yoon et al. | |
| 2004/0111186 A1 | 6/2004 | Rossi et al. | |
| 2004/0117330 A1 | 6/2004 | Ehlers et al. | |
| 2004/0139038 A1 | 7/2004 | Ehlers et al. | |
| 2004/0143360 A1 | 7/2004 | Kiesel et al. | |
| 2004/0146008 A1 | 7/2004 | Conradt et al. | |
| 2004/0156360 A1 | 8/2004 | Sexton et al. | |
| 2004/0159112 A1 | 8/2004 | Jayanth et al. | |
| 2004/0189590 A1 | 9/2004 | Mehaffey et al. | |
| 2004/0204775 A1 | 10/2004 | Keyes et al. | |
| 2004/0205781 A1 | 10/2004 | Hill et al. | |
| 2004/0206096 A1 | 10/2004 | Jayanth | |
| 2004/0210348 A1 | 10/2004 | Imhof et al. | |
| 2004/0218591 A1 | 11/2004 | Ogawa et al. | |
| 2004/0236471 A1 | 11/2004 | Poth | |
| 2004/0266491 A1 | 12/2004 | Howard et al. | |
| 2004/0267790 A1 | 12/2004 | Pak et al. | |
| 2005/0005249 A1 | 1/2005 | Hill et al. | |
| 2005/0007249 A1 | 1/2005 | Eryurek et al. | |
| 2005/0010759 A1 | 1/2005 | Wakiyama | |
| 2005/0033707 A1 | 2/2005 | Ehlers et al. | |
| 2005/0034023 A1 | 2/2005 | Maturana et al. | |
| 2005/0041633 A1 | 2/2005 | Roeser et al. | |
| 2005/0054381 A1 | 3/2005 | Lee et al. | |
| 2005/0055427 A1 | 3/2005 | Frutiger et al. | |
| 2005/0068978 A1 | 3/2005 | Sexton et al. | |
| 2005/0076150 A1 | 4/2005 | Lee et al. | |
| 2005/0080879 A1 | 4/2005 | Kim et al. | |
| 2005/0081156 A1 | 4/2005 | Clark et al. | |
| 2005/0081157 A1 | 4/2005 | Clark et al. | |
| 2005/0096872 A1 | 5/2005 | Blevins et al. | |

| | | | | | |
|---|---|---|---|---|---|
| 2005/0109048 A1 | 5/2005 | Lee | 2007/0045431 A1 | 3/2007 | Chapman et al. |
| 2005/0116023 A1 | 6/2005 | Amundson et al. | 2007/0045442 A1 | 3/2007 | Chapman et al. |
| 2005/0118996 A1 | 6/2005 | Lee et al. | 2007/0051818 A1 | 3/2007 | Atlas |
| 2005/0119766 A1 | 6/2005 | Amundson et al. | 2007/0055407 A1 | 3/2007 | Goldberg et al. |
| 2005/0120012 A1 | 6/2005 | Poth et al. | 2007/0067496 A1 | 3/2007 | Deiretsbacher et al. |
| 2005/0125495 A1 | 6/2005 | Tjong et al. | 2007/0073973 A1 | 3/2007 | Hazay |
| 2005/0143138 A1 | 6/2005 | Lee et al. | 2007/0080235 A1 | 4/2007 | Fulton, Jr. |
| 2005/0145705 A1 | 7/2005 | Shah et al. | 2007/0083721 A1 | 4/2007 | Grinspan |
| 2005/0150967 A1 | 7/2005 | Chapman et al. | 2007/0084937 A1 | 4/2007 | Ahmed |
| 2005/0161517 A1 | 7/2005 | Helt et al. | 2007/0088883 A1 | 4/2007 | Wakabayashi |
| 2005/0166610 A1 | 8/2005 | Jayanth | 2007/0089090 A1 | 4/2007 | Riedl et al. |
| 2005/0176410 A1 | 8/2005 | Brooking et al. | 2007/0090199 A1 | 4/2007 | Hull et al. |
| 2005/0193155 A1 | 9/2005 | Fujita | 2007/0093226 A1 | 4/2007 | Foltyn et al. |
| 2005/0223339 A1 | 10/2005 | Lee | 2007/0102149 A1 | 5/2007 | Kates |
| 2005/0229610 A1 | 10/2005 | Park et al. | 2007/0109975 A1 | 5/2007 | Reckamp et al. |
| 2005/0235661 A1 | 10/2005 | Pham | 2007/0113247 A1 | 5/2007 | Kwak |
| 2005/0235662 A1 | 10/2005 | Pham | 2007/0119957 A1 | 5/2007 | Kates |
| 2005/0235663 A1 | 10/2005 | Pham | 2007/0119958 A1 | 5/2007 | Kates |
| 2005/0258257 A1 | 11/2005 | Thurman et al. | 2007/0129820 A1 | 6/2007 | Glanzer et al. |
| 2005/0270151 A1 | 12/2005 | Winick | 2007/0129825 A1 | 6/2007 | Kargenian |
| 2005/0278071 A1 | 12/2005 | Durham, III | 2007/0129826 A1 | 6/2007 | Kreidler et al. |
| 2005/0280364 A1 | 12/2005 | Omura et al. | 2007/0129917 A1 | 6/2007 | Blevins et al. |
| 2005/0281368 A1 | 12/2005 | Droba et al. | 2007/0130834 A1 | 6/2007 | Kande et al. |
| 2005/0288823 A1 | 12/2005 | Hesse et al. | 2007/0130969 A1 | 6/2007 | Peterson et al. |
| 2006/0006244 A1 | 1/2006 | Morrow et al. | 2007/0135692 A1 | 6/2007 | Hwang et al. |
| 2006/0021358 A1 | 2/2006 | Nallapa | 2007/0135946 A1 | 6/2007 | Sugiyama et al. |
| 2006/0021359 A1 | 2/2006 | Hur et al. | 2007/0136669 A1 | 6/2007 | Kwon et al. |
| 2006/0030954 A1 | 2/2006 | Bergman et al. | 2007/0136687 A1 | 6/2007 | Pak |
| 2006/0041898 A1 | 2/2006 | Potyrailo et al. | 2007/0138307 A1 | 6/2007 | Khoo |
| 2006/0048064 A1 | 3/2006 | Vronay | 2007/0138308 A1 | 6/2007 | Schultz et al. |
| 2006/0058924 A1 | 3/2006 | Shah | 2007/0143704 A1 | 6/2007 | Laird-McConnell |
| 2006/0090142 A1 | 4/2006 | Glasgow et al. | 2007/0143707 A1 | 6/2007 | Yun et al. |
| 2006/0090483 A1 | 5/2006 | Kim et al. | 2007/0158442 A1 | 7/2007 | Chapman et al. |
| 2006/0091227 A1 | 5/2006 | Attridge | 2007/0168887 A1 | 7/2007 | Lee |
| 2006/0092977 A1 | 5/2006 | Bai et al. | 2007/0177505 A1 | 8/2007 | Charrua et al. |
| 2006/0106791 A1 | 5/2006 | Morrow et al. | 2007/0191024 A1 | 8/2007 | Kim et al. |
| 2006/0108432 A1 | 5/2006 | Mattheis | 2007/0192731 A1 | 8/2007 | Townsend et al. |
| 2006/0111816 A1 | 5/2006 | Spalink et al. | 2007/0204637 A1 | 9/2007 | Fujii et al. |
| 2006/0130497 A1 | 6/2006 | Kang et al. | 2007/0205297 A1 | 9/2007 | Finkam et al. |
| 2006/0144055 A1 | 7/2006 | Ahn | 2007/0208461 A1 | 9/2007 | Chase |
| 2006/0144232 A1 | 7/2006 | Kang et al. | 2007/0208549 A1 | 9/2007 | Blevins et al. |
| 2006/0149414 A1 | 7/2006 | Archacki et al. | 2007/0213853 A1 | 9/2007 | Glanzer et al. |
| 2006/0150027 A1 | 7/2006 | Paden | 2007/0223500 A1 | 9/2007 | Lee et al. |
| 2006/0153247 A1 | 7/2006 | Stumer | 2007/0225868 A1 | 9/2007 | Terlson et al. |
| 2006/0155398 A1 | 7/2006 | Hoffberg et al. | 2007/0225869 A1 | 9/2007 | Amundson et al. |
| 2006/0158051 A1 | 7/2006 | Bartlett et al. | 2007/0237032 A1 | 10/2007 | Rhee et al. |
| 2006/0159007 A1 | 7/2006 | Frutiger et al. | 2007/0238413 A1 | 10/2007 | Coutts |
| 2006/0168522 A1 | 7/2006 | Bala | 2007/0239658 A1 | 10/2007 | Cunningham et al. |
| 2006/0186214 A1 | 8/2006 | Simon et al. | 2007/0240226 A1 | 10/2007 | Song et al. |
| 2006/0190138 A1 | 8/2006 | Stone et al. | 2007/0241203 A1 | 10/2007 | Wagner et al. |
| 2006/0192021 A1 | 8/2006 | Schultz et al. | 2007/0242058 A1 | 10/2007 | Yamada |
| 2006/0196953 A1 | 9/2006 | Simon et al. | 2007/0245306 A1 | 10/2007 | Dameshek et al. |
| 2006/0200253 A1 | 9/2006 | Hoffberg et al. | 2007/0257120 A1 | 11/2007 | Chapman, Jr. et al. |
| 2006/0200258 A1 | 9/2006 | Hoffberg et al. | 2007/0260978 A1 | 11/2007 | Oh et al. |
| 2006/0200259 A1 | 9/2006 | Hoffberg et al. | 2007/0266329 A1 | 11/2007 | Gaudette |
| 2006/0200260 A1 | 9/2006 | Hoffberg et al. | 2007/0271521 A1 | 11/2007 | Harriger et al. |
| 2006/0202978 A1 | 9/2006 | Lee et al. | 2007/0274093 A1 | 11/2007 | Haim et al. |
| 2006/0206220 A1 | 9/2006 | Amundson | 2007/0277013 A1 | 11/2007 | Rexha et al. |
| 2006/0209208 A1 | 9/2006 | Kim et al. | 2007/0278320 A1 | 12/2007 | Lunacek et al. |
| 2006/0219799 A1 | 10/2006 | Schultz et al. | 2007/0284452 A1 | 12/2007 | Butler et al. |
| 2006/0229090 A1 | 10/2006 | LaDue | 2007/0299857 A1 | 12/2007 | Gwozdz et al. |
| 2006/0235548 A1 | 10/2006 | Gaudette | 2007/0300064 A1 | 12/2007 | Isaacs et al. |
| 2006/0236351 A1 | 10/2006 | Ellerbrock et al. | 2008/0004727 A1 | 1/2008 | Glanzer et al. |
| 2006/0239296 A1 | 10/2006 | Jinzaki et al. | 2008/0005428 A1 | 1/2008 | Maul et al. |
| 2006/0248233 A1 | 11/2006 | Park et al. | 2008/0006709 A1 | 1/2008 | Ashworth et al. |
| 2006/0276917 A1 | 12/2006 | Li et al. | 2008/0031147 A1 | 2/2008 | Fieremans et al. |
| 2007/0005191 A1 | 1/2007 | Sloup et al. | 2008/0040351 A1 | 2/2008 | Jin et al. |
| 2007/0008116 A1 | 1/2007 | Bergman et al. | 2008/0048045 A1 | 2/2008 | Butler et al. |
| 2007/0012052 A1 | 1/2007 | Butler et al. | 2008/0054082 A1 | 3/2008 | Evans et al. |
| 2007/0013534 A1 | 1/2007 | DiMaggio | 2008/0055190 A1 | 3/2008 | Lee |
| 2007/0014233 A1 | 1/2007 | Oguro et al. | 2008/0057872 A1 | 3/2008 | McFarland et al. |
| 2007/0016311 A1 | 1/2007 | Bergman et al. | 2008/0059682 A1 | 3/2008 | Cooley et al. |
| 2007/0016476 A1 | 1/2007 | Hoffberg et al. | 2008/0062892 A1 | 3/2008 | Dodgen et al. |
| 2007/0025368 A1 | 2/2007 | Ha et al. | 2008/0063006 A1 | 3/2008 | Nichols |
| 2007/0032909 A1 | 2/2007 | Tolbert et al. | 2008/0065926 A1 | 3/2008 | Poth et al. |
| 2007/0033310 A1 | 2/2007 | Kweon | 2008/0072704 A1 | 3/2008 | Clark et al. |
| 2007/0040040 A1 | 2/2007 | Mueller | 2008/0073440 A1 | 3/2008 | Butler et al. |
| 2007/0043478 A1 | 2/2007 | Ehlers et al. | 2008/0077884 A1 | 3/2008 | Patitucci |
| 2007/0045429 A1 | 3/2007 | Chapman et al. | 2008/0077886 A1 | 3/2008 | Eichner |

| | | | | | | |
|---|---|---|---|---|---|---|
| 2008/0083009 A1 | 4/2008 | Kaler et al. | | 2008/0195254 A1 | 8/2008 | Jung et al. |
| 2008/0097651 A1 | 4/2008 | Shah et al. | | 2008/0195687 A1 | 8/2008 | Jung et al. |
| 2008/0104189 A1 | 5/2008 | Baker et al. | | 2008/0215987 A1 | 9/2008 | Alexander et al. |
| 2008/0114500 A1 | 5/2008 | Hull et al. | | 2008/0217418 A1 | 9/2008 | Helt et al. |
| 2008/0128523 A1 | 6/2008 | Hoglund et al. | | 2008/0223944 A1 | 9/2008 | Helt et al. |
| 2008/0133033 A1 | 6/2008 | Wolff et al. | | 2008/0256475 A1 | 10/2008 | Amundson et al. |
| 2008/0133060 A1 | 6/2008 | Hoglund et al. | | 2008/0264085 A1 | 10/2008 | Perry et al. |
| 2008/0133061 A1 | 6/2008 | Hoglund et al. | | 2008/0294274 A1 | 11/2008 | Laberge et al. |
| 2008/0134087 A1 | 6/2008 | Hoglund et al. | | 2008/0294932 A1 | 11/2008 | Oshins et al. |
| 2008/0134098 A1 | 6/2008 | Hoglund et al. | | 2009/0001180 A1 | 1/2009 | Siddaramanna et al. |
| 2008/0161977 A1 | 7/2008 | Takach et al. | | 2009/0001182 A1 | 1/2009 | Siddaramanna et al. |
| 2008/0161978 A1 | 7/2008 | Shah | | 2009/0049847 A1 | 2/2009 | Butler et al. |
| 2008/0168356 A1 | 7/2008 | Eryurek et al. | | 2009/0261174 A1 | 10/2009 | Butler et al. |
| 2008/0183335 A1 | 7/2008 | Poth et al. | | 2010/0169419 A1* | 7/2010 | DeVilbiss et al. ............ 709/204 |
| 2008/0185976 A1 | 8/2008 | Dickey et al. | | | | |
| 2008/0186160 A1 | 8/2008 | Kim et al. | | * cited by examiner | | |

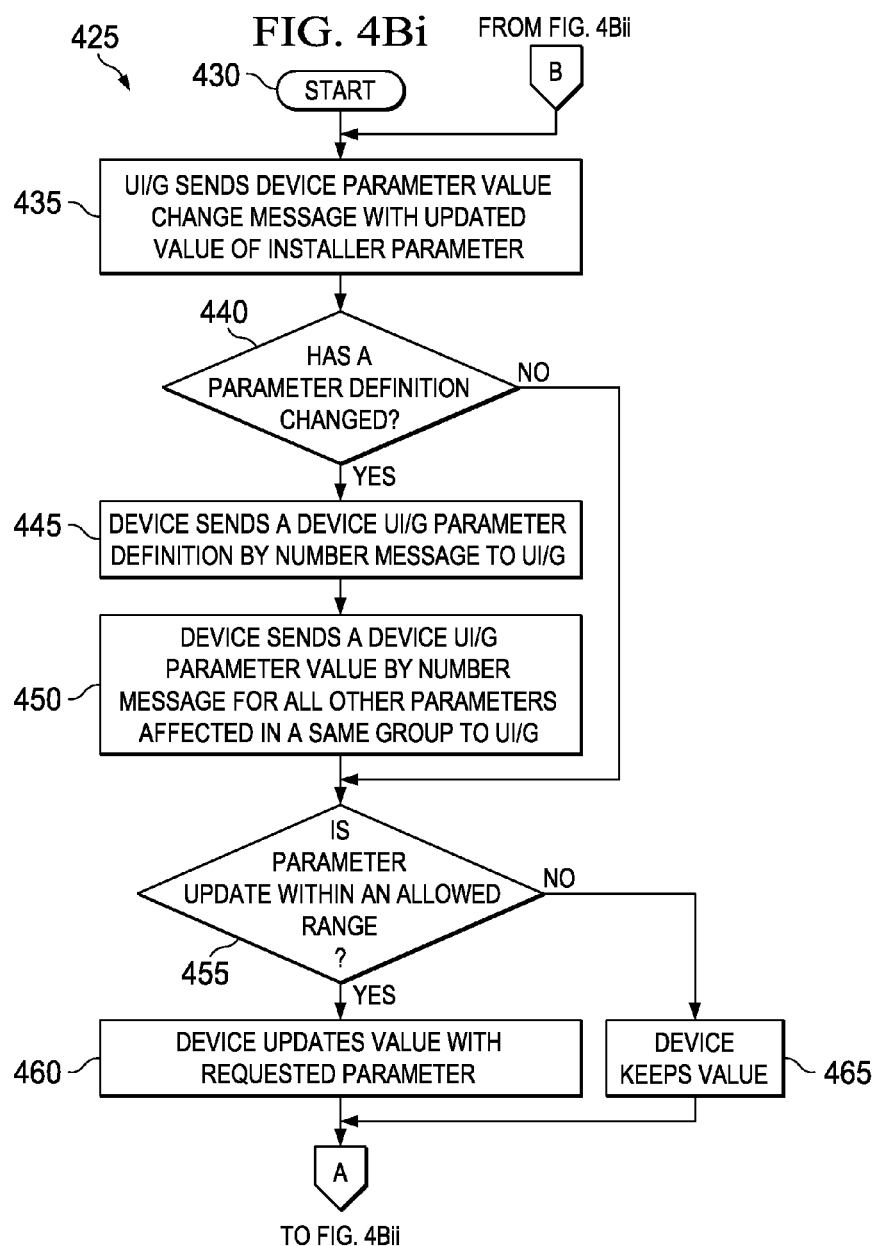

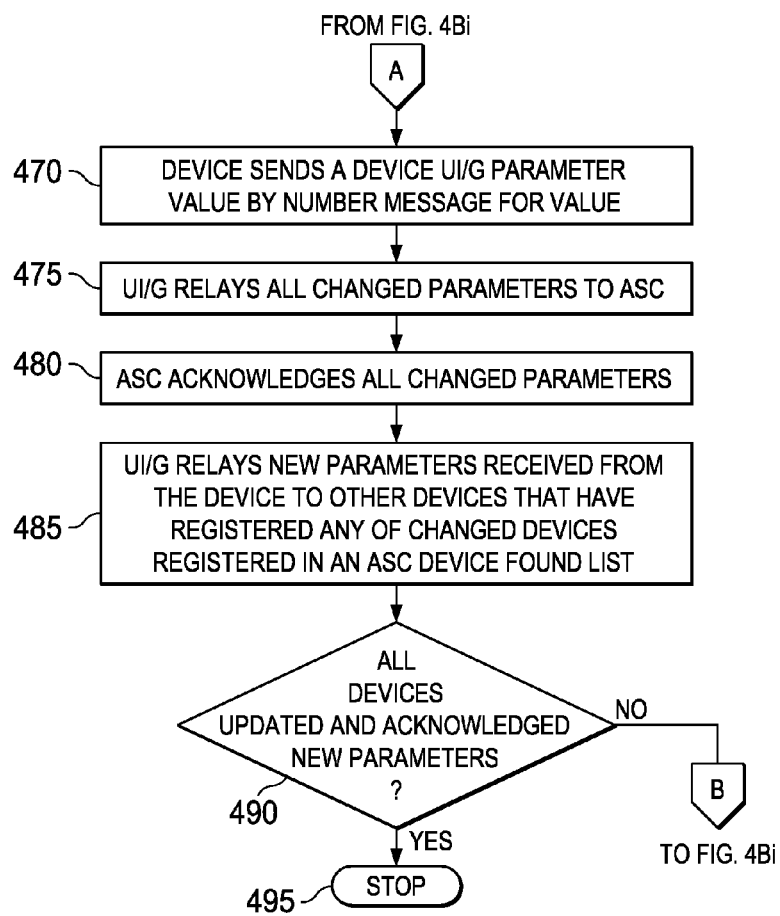
FIG. 4Bii

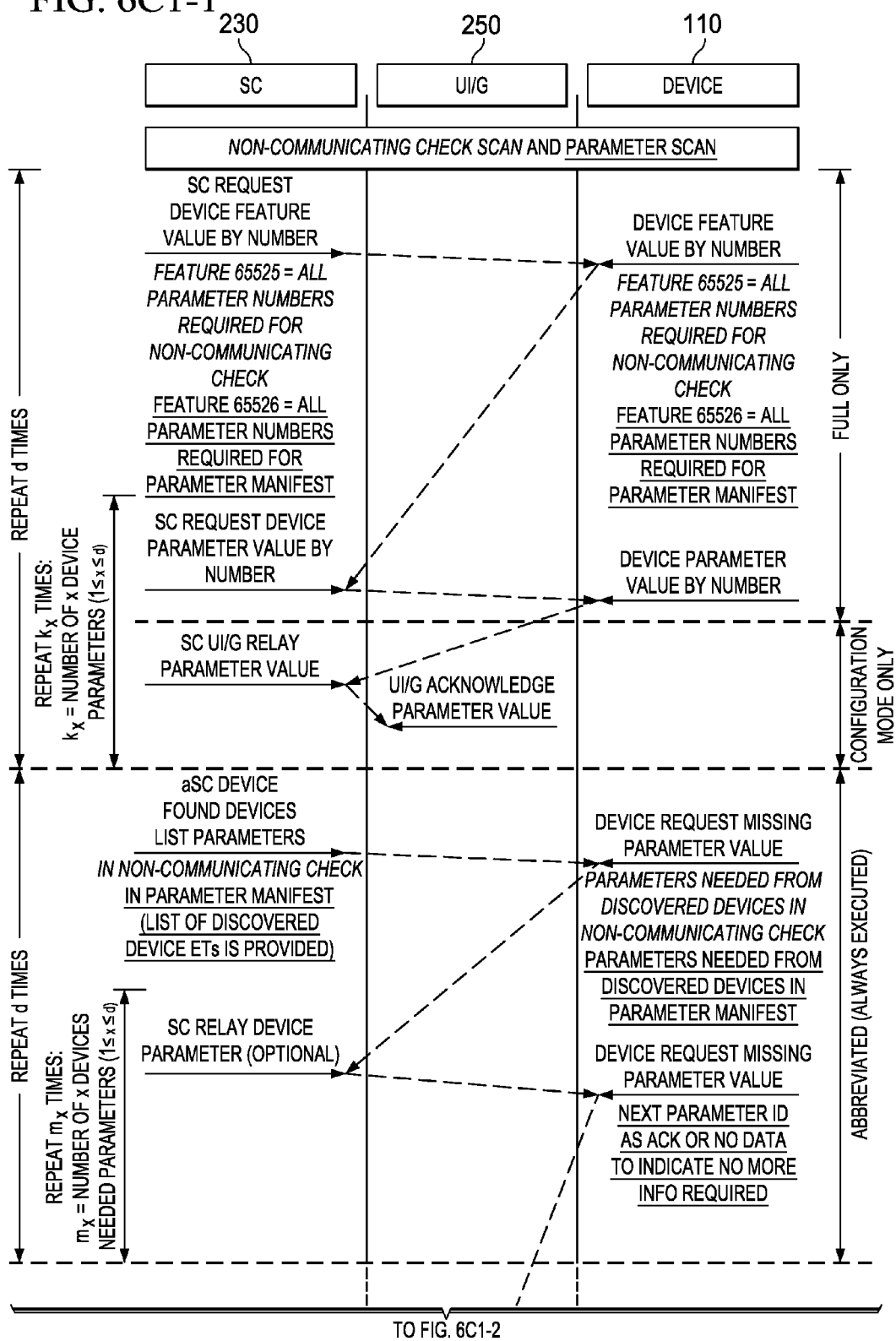
FIG. 6C1-1

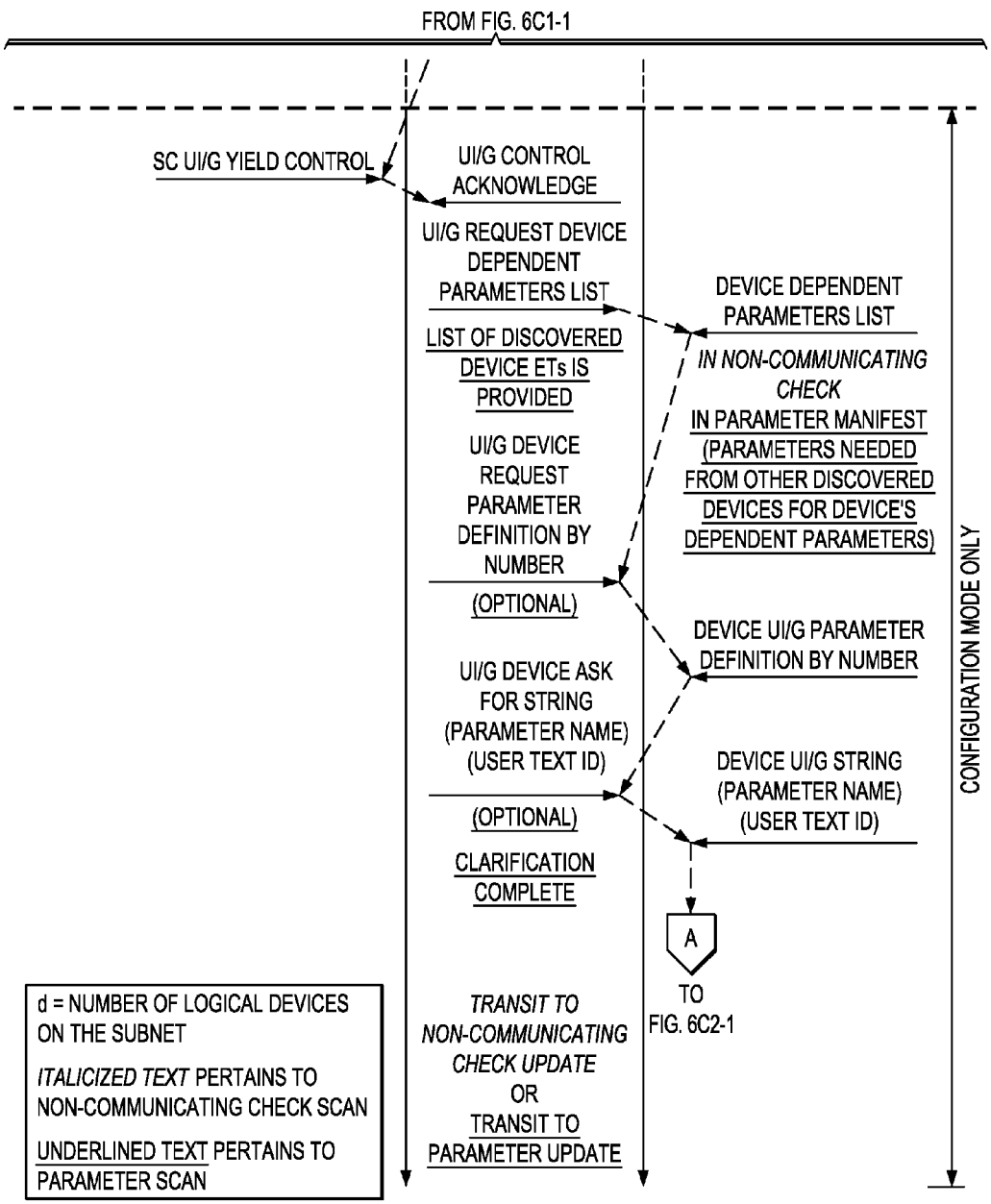
FIG. 6C1-2

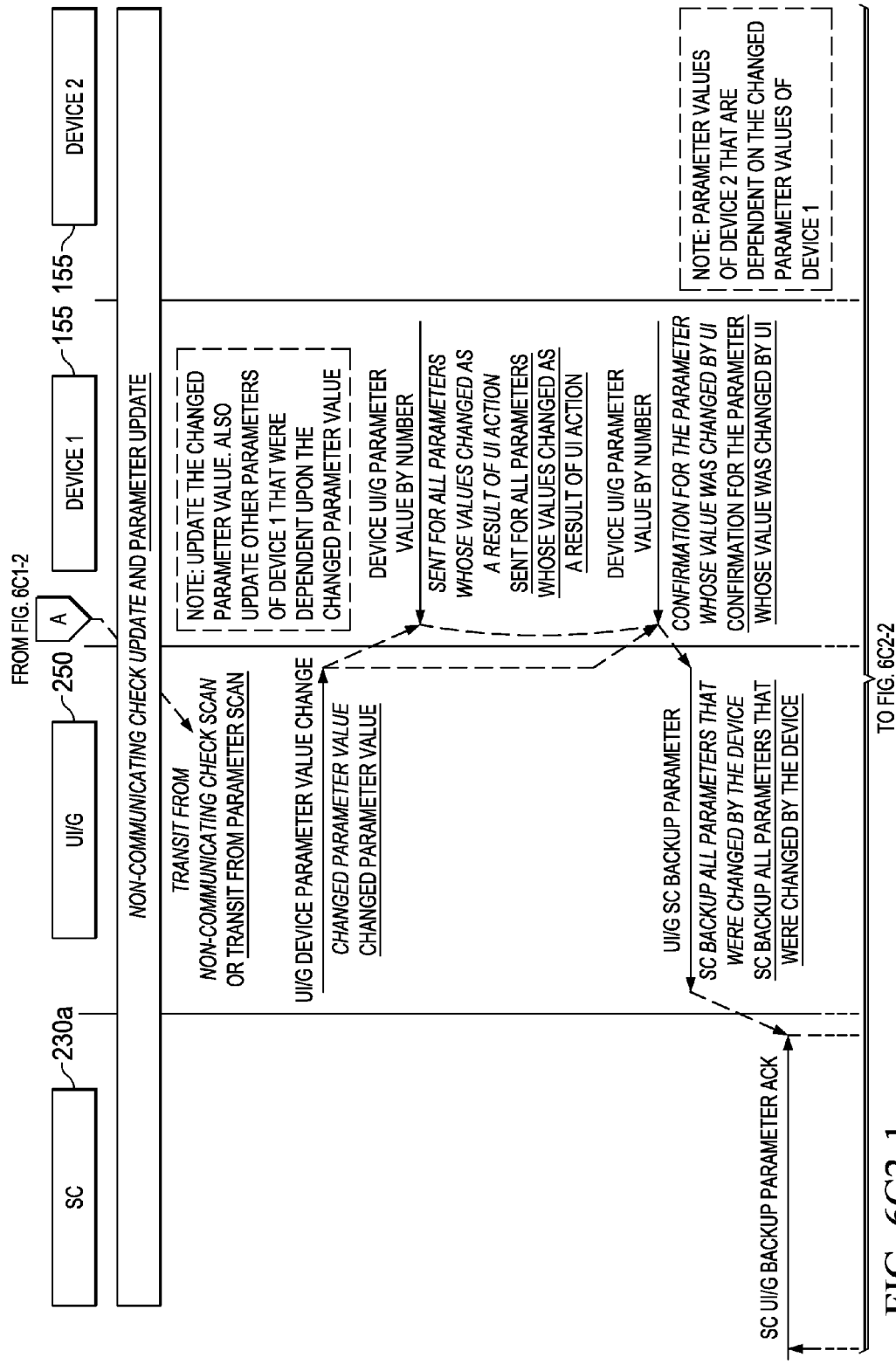
FIG. 6C2-1

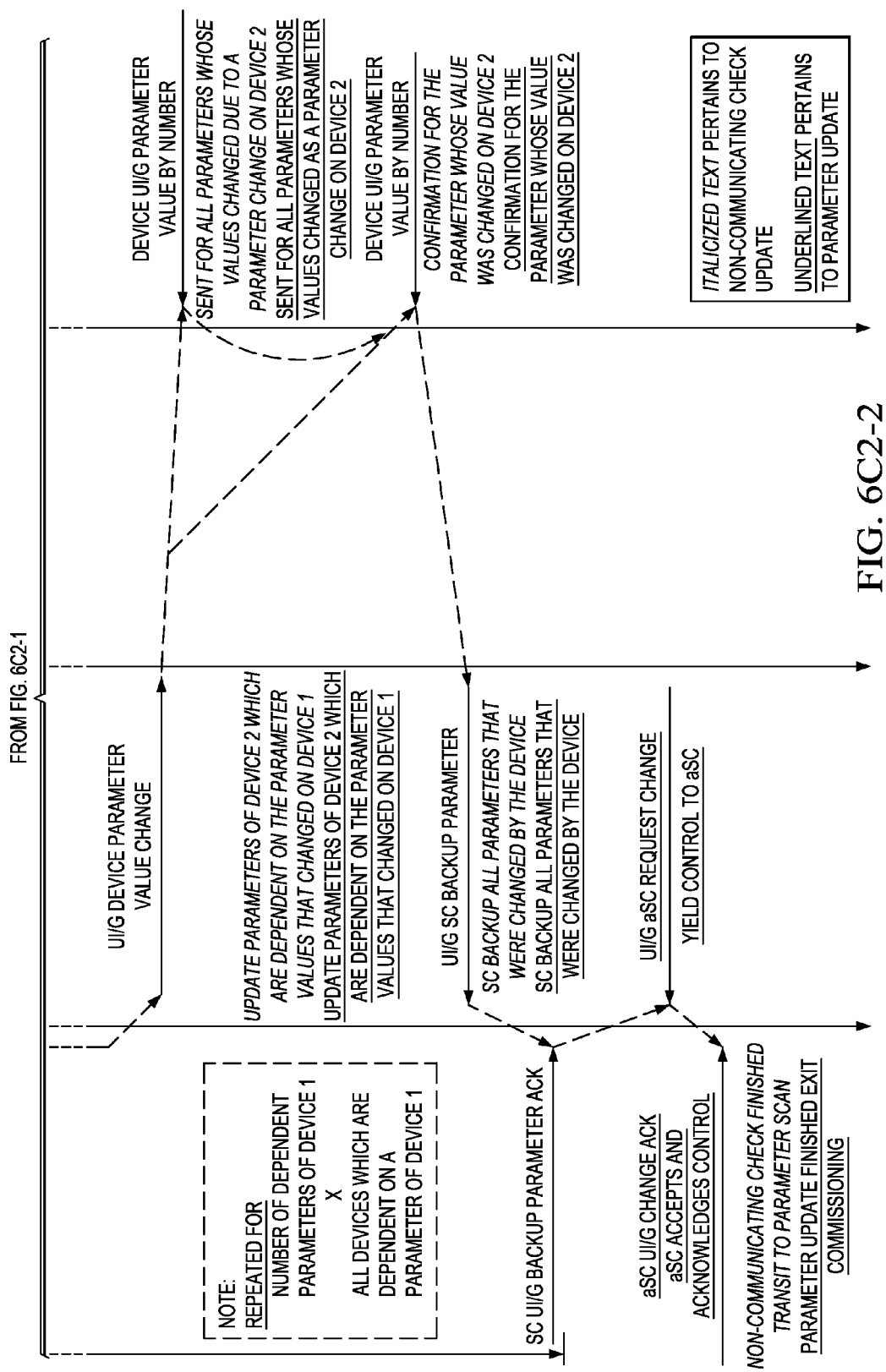
FIG. 6C2-2

FIG. 7A1

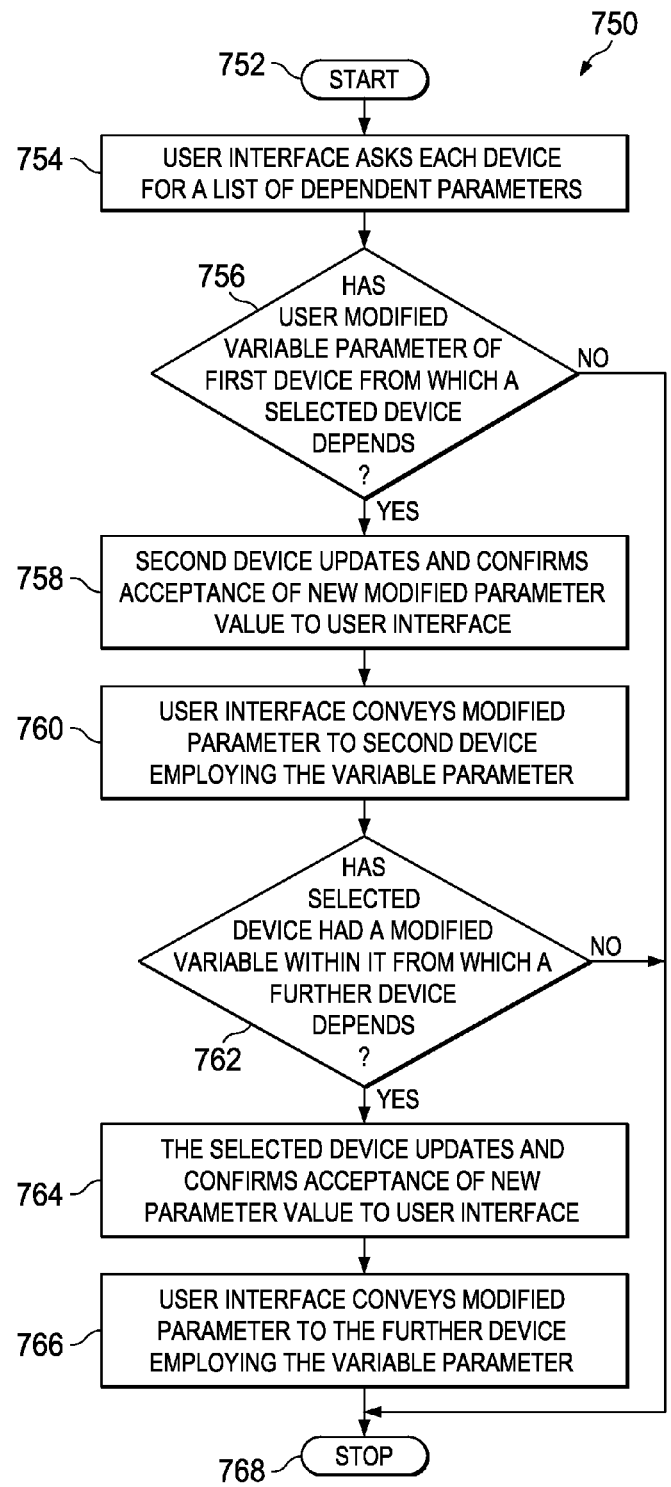
FIG. 7A2

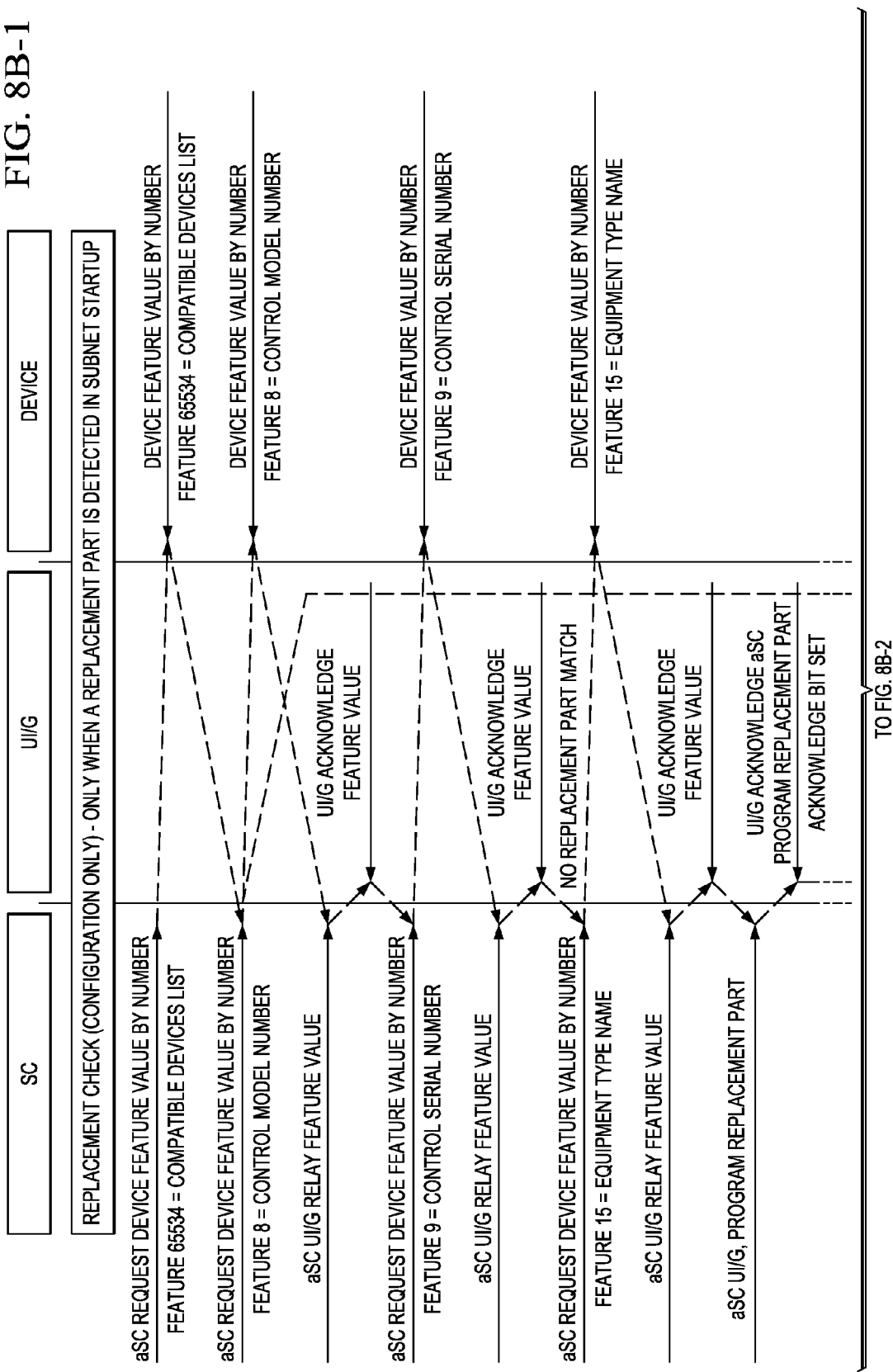

DEVICE COMMISSIONING IN A HEATING, VENTILATION AND AIR CONDITIONING NETWORK

CROSS-REFERENCE TO RELATED APPLICATIONS

This application claims the benefit of U.S. Provisional Application Ser. No. 61/167,135, filed by Grohman, et al., on Apr. 6, 2009, entitled "Comprehensive HVAC Control System", and is a continuation-in-part application of application Ser. No. 12/258,659, filed by Grohman on Oct. 27, 2008, entitled "Apparatus and Method for Controlling an Environmental Conditioning Unit," both of which are commonly assigned with this application and incorporated herein by reference. This application is also related to the following U.S. patent applications, which are filed on even date herewith, commonly assigned with this application and incorporated herein by reference:

| Ser. No. | Inventors | Title |
| --- | --- | --- |
| 12/603,464 | Grohman, et al. | "Alarm and Diagnostics System and Method for a Distributed-Architecture Heating, Ventilation and Air Conditioning Network" |
| 12/603,534 | Wallaert, et al. | "Flush Wall Mount Controller and In-Set Mounting Plate for a Heating, Ventilation and Air Conditioning System" |
| 12/603,449 | Thorson, et al. | "System and Method of Use for a User Interface Dashboard of a Heating, Ventilation and Air Conditioning Network" |
| 12/603,382 | Grohman | "Device Abstraction System and Method for a Distributed-Architecture Heating, Ventilation and Air Conditioning Network" |
| 12/603,526 | Grohman, et al. | "Communication Protocol System and Method for a Distributed-Architecture Heating, Ventilation and Air Conditioning Network" |
| 12/603,490 | Grohman | "System Recovery in a Heating, Ventilation and Air Conditioning Network" |
| 12/603,473 | Grohman, et al. | "System and Method for Zoning a Distributed-Architecture Heating, Ventilation and Air Conditioning Network" |
| 12/603,525 | Grohman, et al. | "Method of Controlling Equipment in a Heating, Ventilation and Air Conditioning Network" |
| 12/603,512 | Grohman, et al. | "Programming and Configuration in a Heating, Ventilation and Air Conditioning Network" |
| 12/603,431 | Mirza, et al. | "General Control Techniques in a Heating, Ventilation and Air Conditioning Network" |

TECHNICAL FIELD

This application is directed, in general, to distributed-architecture heating, ventilation and air conditioning (HVAC) system, more specifically, to a memory scheme and data recovery in an HVAC network.

BACKGROUND

Climate control systems, also referred to as HVAC systems (the two terms will be used herein interchangeably), are employed to regulate the temperature, humidity and air quality of premises, such as a residence, office, store, warehouse, vehicle, trailer, or commercial or entertainment venue. The most basic climate control systems either move air (typically by means of an air handler or, or more colloquially, a fan or blower), heat air (typically by means of a furnace) or cool air (typically by means of a compressor-driven refrigerant loop). A thermostat is typically included in the climate control systems to provide some level of automatic temperature control. In its simplest form, a thermostat turns the climate control system on or off as a function of a detected temperature. In a more complex form, a thermostat may take other factors, such as humidity or time, into consideration. Still, however, the operation of a thermostat remains turning the climate control system on or off in an attempt to maintain the temperature of the premises as close as possible to a desired setpoint temperature. Climate control systems as described above have been in wide use since the middle of the twentieth century.

SUMMARY

A first aspect provides a method for commissioning a first device that can communicate with a second device. In an embodiment, the method includes entering a commissioning process by the first device in a subnet of the HVAC network. A second device's feature manifest is read by the first device. The method sets a parameter validity, as determined by the second device's feature manifest, by the first device. An internal parameter value is set by the first device. In a further embodiment, an installer is informed concerning a validity and value of the parameter.

Another aspect provides an HVAC system. In an embodiment, the system comprises a first device of the HVAC system, a second device of the HVAC system, and a subnet coupled to the first device and the second device. The system further comprises a second device's feature manifest that is readable by the first device after the first device enters a commissioning process. The system yet further includes a parameter validity indicia, as determined by the second device's feature manifest by the first device. The system yet still further includes an internal parameter value of the device, and as output to convey to an installer: a) the parameter validity, and b) the value of the internal parameter.

Still another aspect provides an HVAC system. In an embodiment, the system comprises a first device of the HVAC system, a second device of the HVAC system, and a subnet coupled to the first device and the second device. The system further comprises a second device's feature manifest that is readable by the first device after the first device enters a commissioning process. The system yet further includes a parameter validity indicia, as determined by the second device's feature manifest by the first device. The system yet still further includes an internal parameter value of the device, and as output to convey to an installer: a) the parameter validity, and b) the value of the internal parameter, wherein the parameter change value can be received over an Internet.

BRIEF DESCRIPTION

Reference is now made to the following descriptions taken in conjunction with the accompanying drawings, in which.

Figure 1:
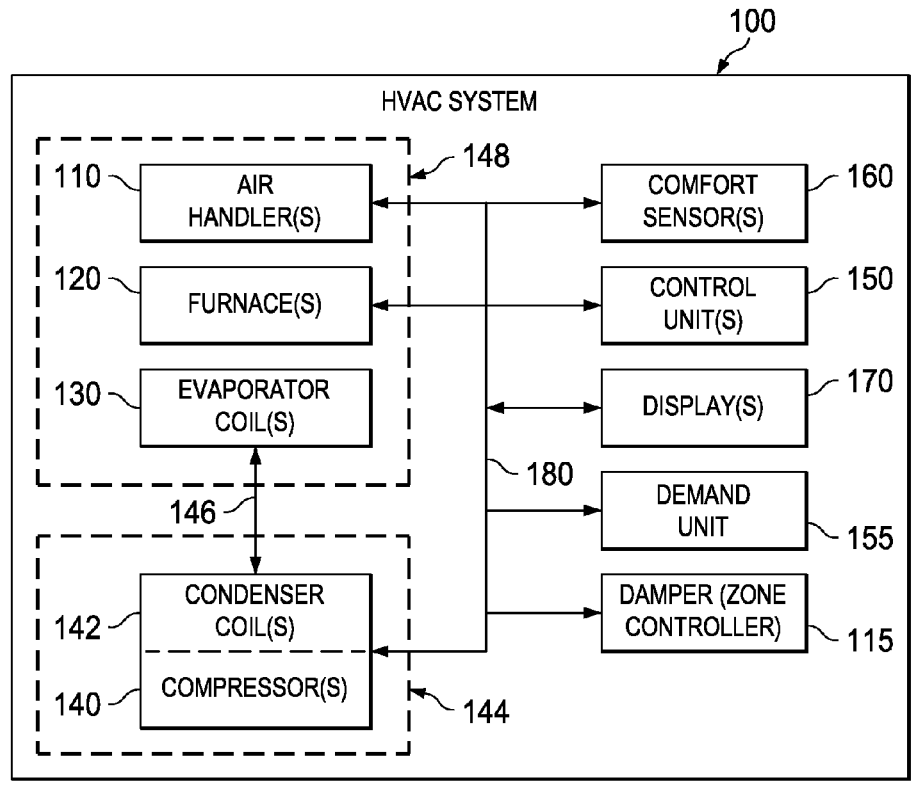
FIG. 1 is a high-level block diagram of an HVAC system within which a device abstraction system and method may be contained or carried out.
Figure 2:
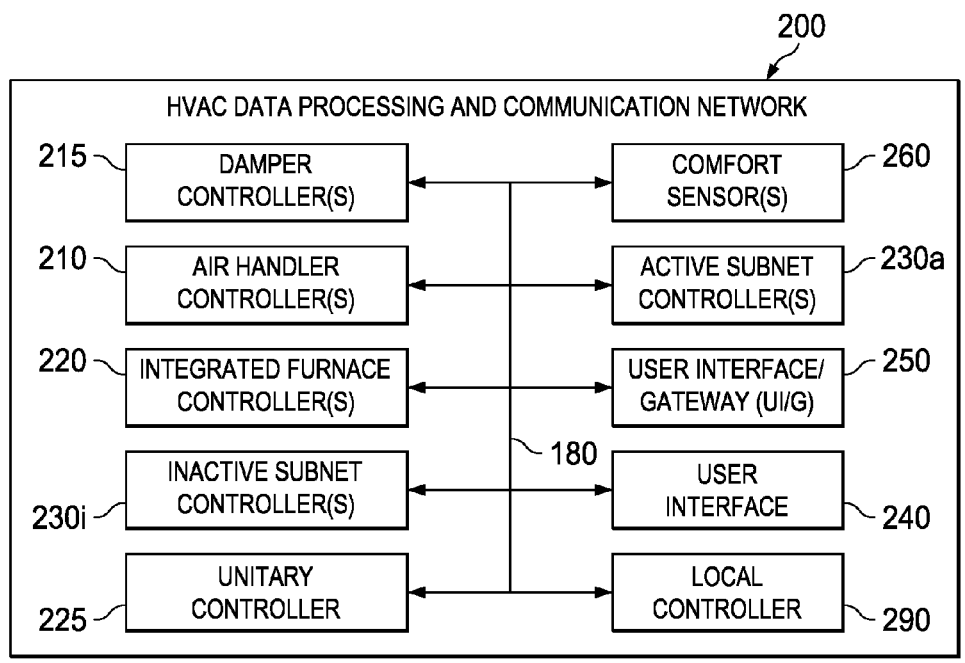
FIG. 2 is a high-level block diagram of one embodiment of an HVAC data processing and communication network 200.
Figure 5:
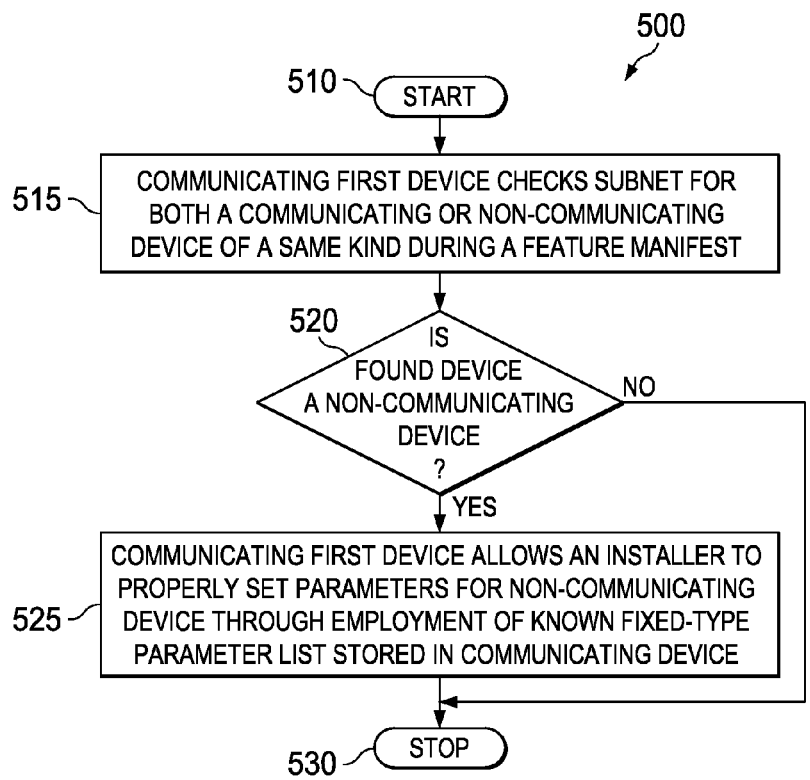
Figure 6A:
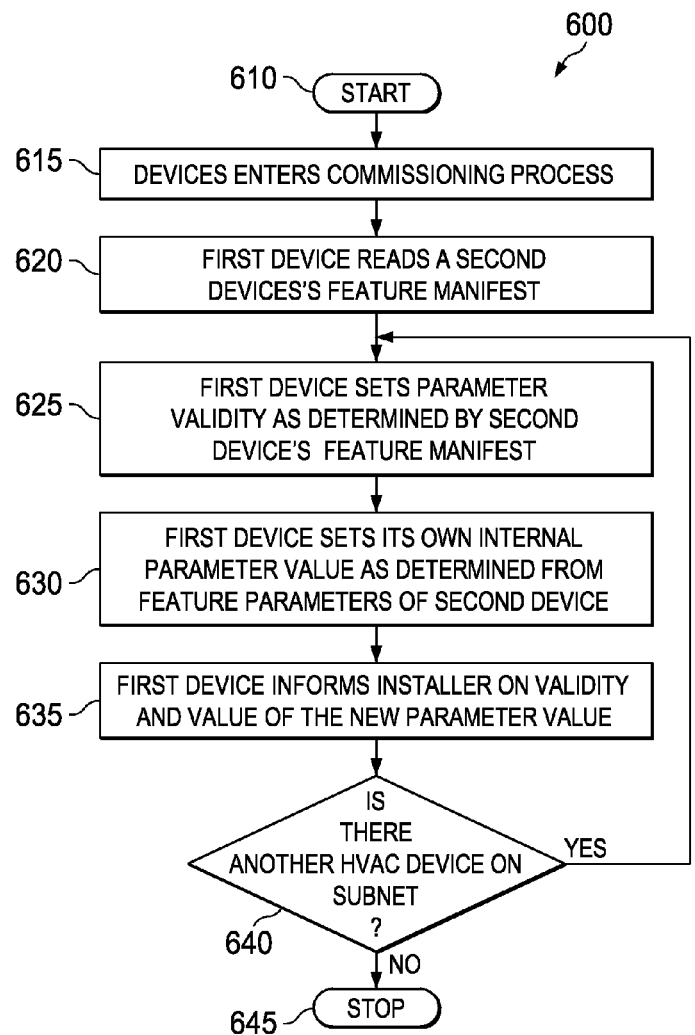
Figure 6B:
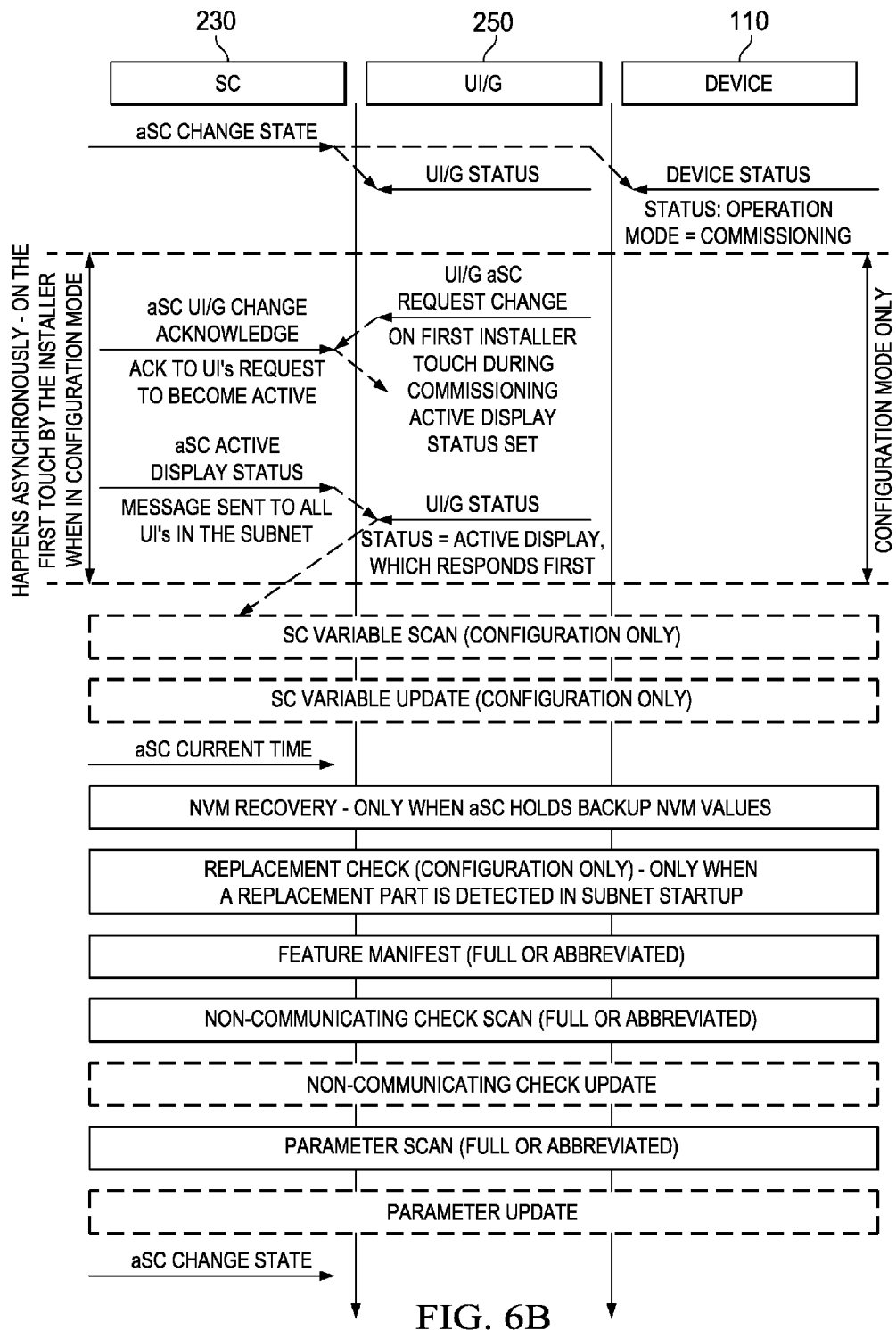
Figure 7B:
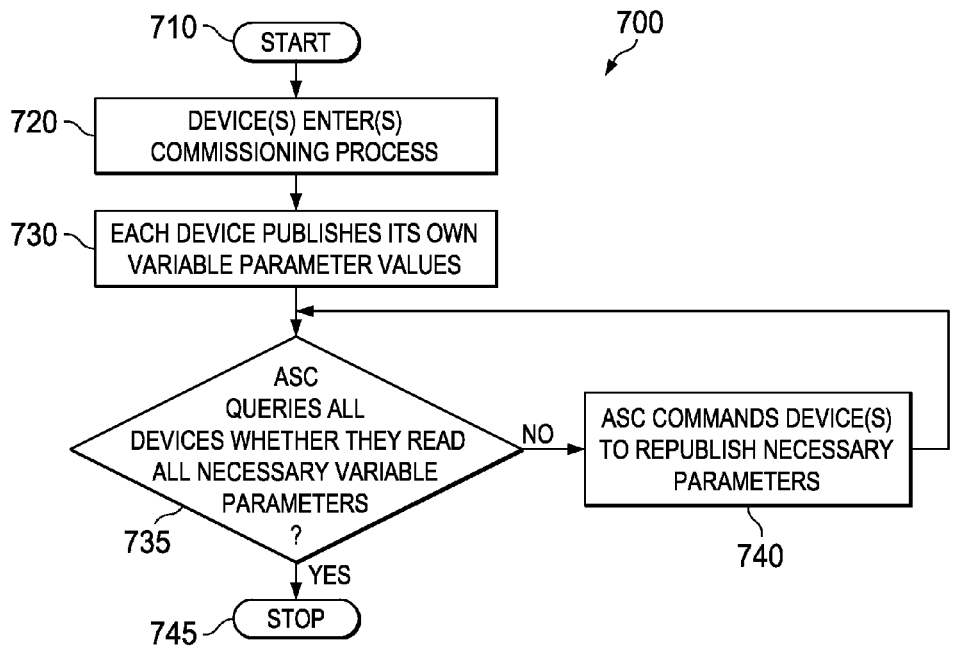
Figure 7B:
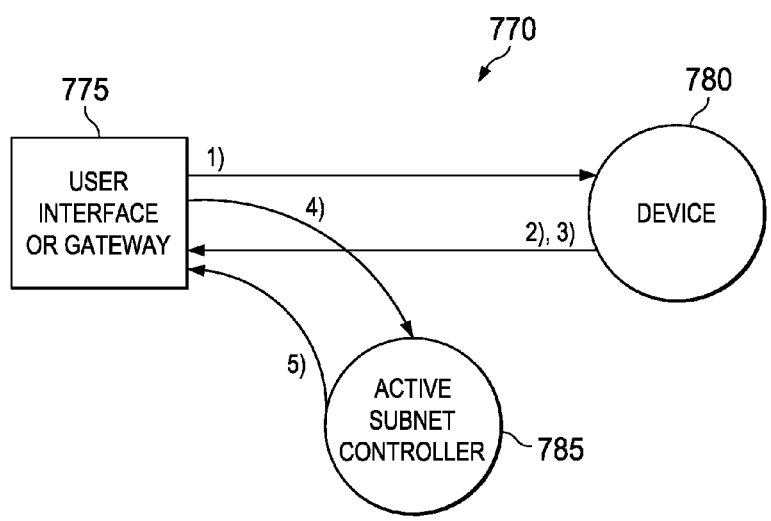

FIG. 4Bi and 4Bii illustrate an exemplary flow diagram of a second approach of a method directed towards configuration of variable parameters of an HVAC device that are dependent upon other parameters, having a value and a range, within that same HVAC device;

FIG. 5 illustrates an exemplary flow for a method for a third approach commissioning an HVAC device attached to a non-communicating device that enables the use of a manifest of parameter types to configure a non-communicating HVAC device;

FIG. 6A illustrates an exemplary signaling flow for a method for commissioning parameters when validity and value of internal parameters of a device depend on network configuration and/or other device features of the device or devices;

FIG. 6B illustrates an exemplary overview of signaling flows implemented in a commissioning between a subnet controller, a user interface/gateway and another device;

FIG. 6C1 illustrates an exemplary signal flow associated with a "Non-Communicating Check Scan" and "Parameter Scan" sub-states of commissioning state in an HVAC network;

FIG. 6C2 illustrates an exemplary signal flow associated with a "Non-Communicating Check Update" and "Parameter Update" sub-states of commissioning state in an HVAC network;

FIG. 7A1 illustrates an exemplary embodiment of a method flow of propagating variable parameters in an HVAC system as initiated by a subnet controller;

FIG. 7A2 illustrates an exemplary embodiment of illustrates an exemplary embodiment of a method flow of propagating variable parameters in an HVAC system as initiated by a user interface;

FIG. 7B is an illustration of a high-level block diagram of commissioning steps that includes an active subnet controller that can be practices with the method of FIG. 7A2.

Figure 8A:
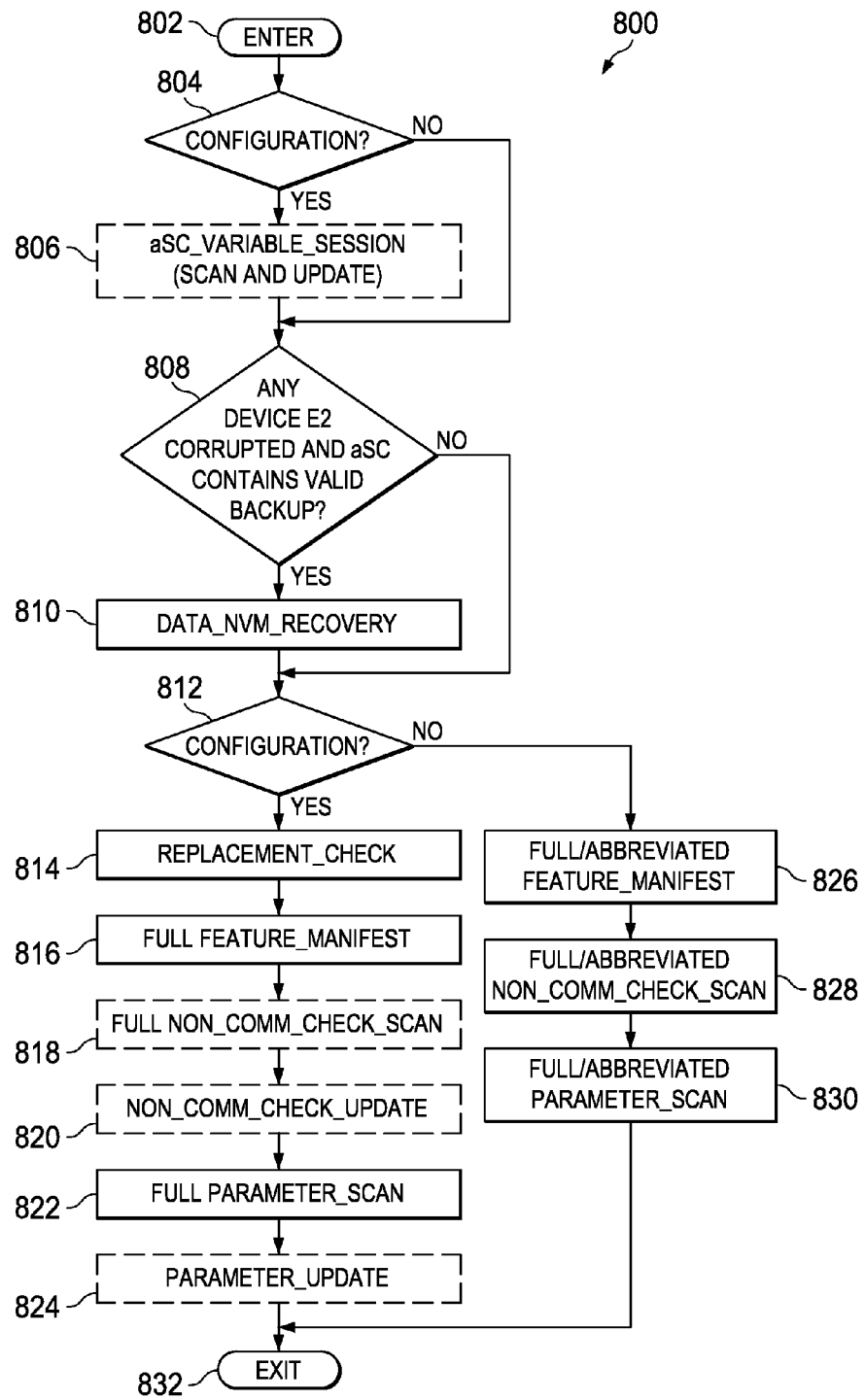
Figures 2, 8B:
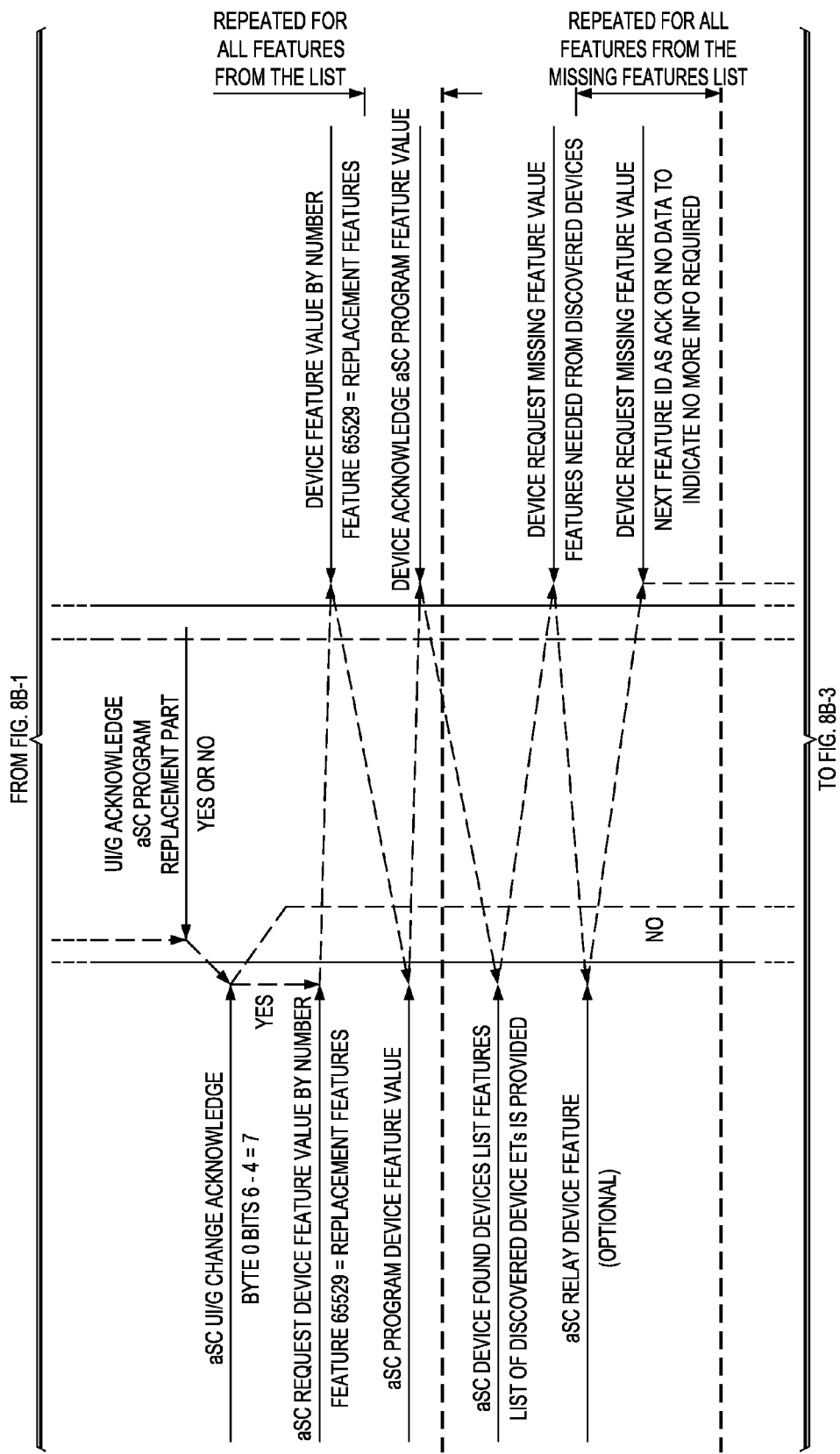
Figures 3, 8B:
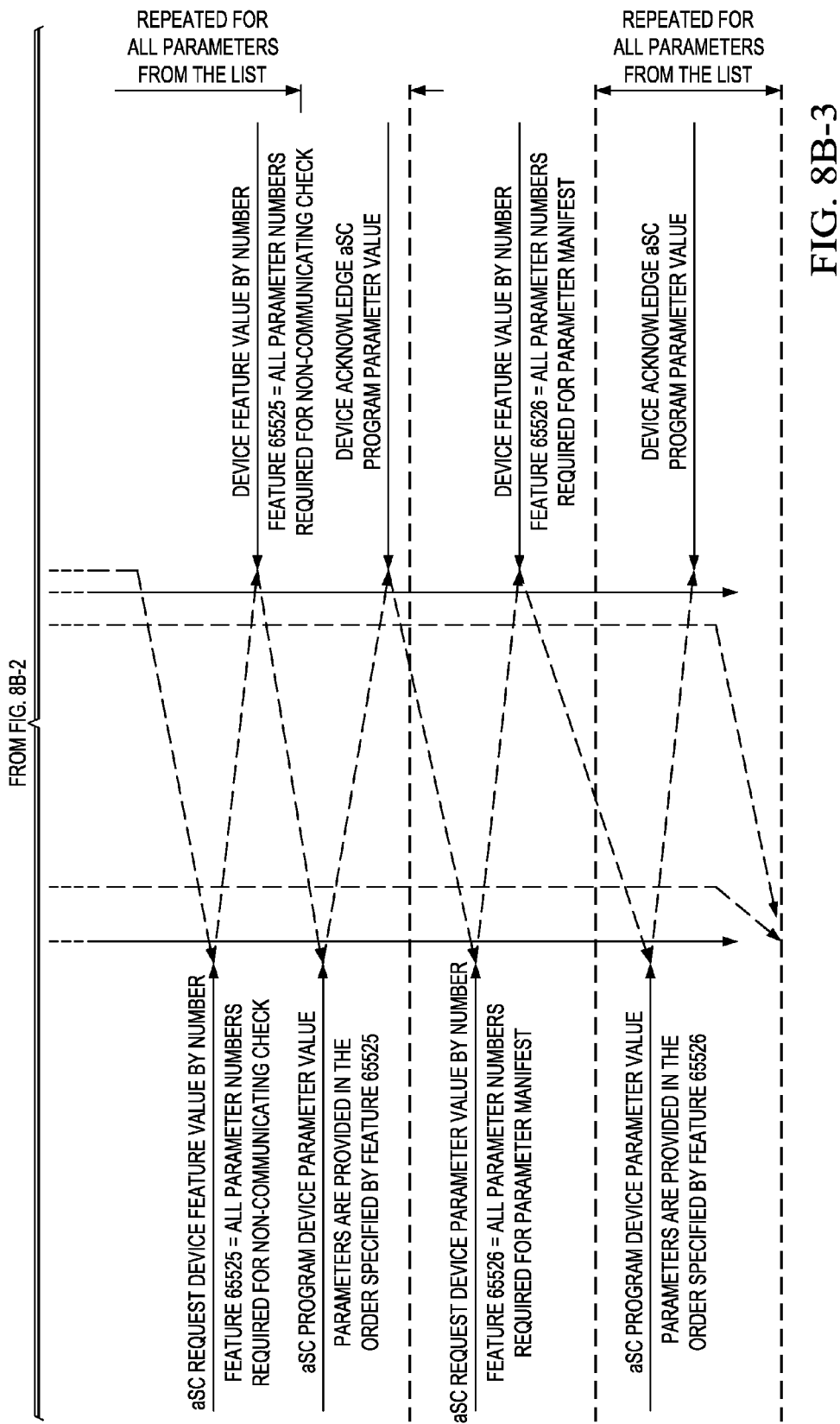
Figure 9:
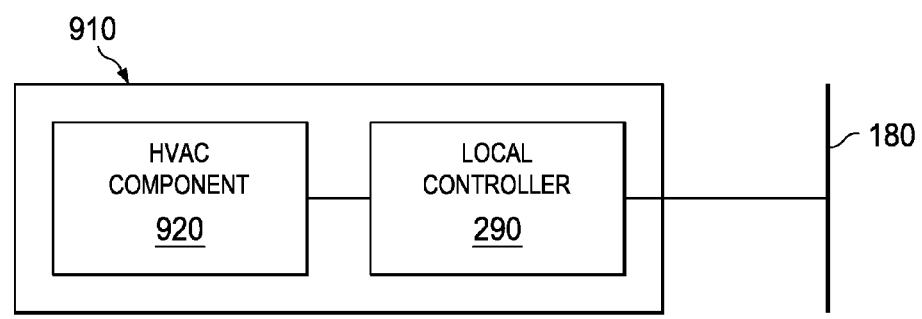

FIG. 8A illustrates an exemplary flow regarding controlling dependent parameters when a parameter of a first device is dependent upon a parameter of a second device of a subnet of an HVAC system;

FIG. 8B illustrates an exemplary signal flow associated with a "Replacement Check Message Flow" sub-states of commissioning state in an HVAC network; and FIG. 9 is a block diagram of a system device of the disclosure.

DETAILED DESCRIPTION

As stated above, conventional climate control systems have been in wide use since the middle of the twentieth century and have, to date, generally provided adequate temperature management. However, it has been realized that more sophisticated control and data acquisition and processing techniques may be developed and employed to improve the installation, operation and maintenance of climate control systems.

Described herein are various embodiments of an improved climate control, or HVAC, system in which at least multiple components thereof communicate with one another via a data bus. The communication allows identity, capability, status and operational data to be shared among the components. In some embodiments, the communication also allows commands to be given. As a result, the climate control system may be more flexible in terms of the number of different premises in which it may be installed, may be easier for an installer to install and configure, may be easier for a user to operate, may provide superior temperature and/or relative humidity (RH) control, may be more energy efficient, may be easier to diagnose and perhaps able to repair itself, may require fewer, simpler repairs and may have a longer service life.

FIG. 1 is a high-level block diagram of an HVAC system, generally designated 100. The HVAC system may be referred to herein simply as "system 100" for brevity. In one embodiment, the system 100 is configured to provide ventilation and therefore includes one or more air handlers 110. In an alternative embodiment, the ventilation includes one or more dampers 115 to control air flow through air ducts (not shown.) Such control may be used in various embodiments in which the system 100 is a zoned system. In the context of a zoned system 100, the one or more dampers 115 may be referred to as zone controllers 115. In an alternative embodiment, the system 100 is configured to provide heating and therefore includes one or more furnaces 120, typically associated with the one or more air handlers 110. In an alternative embodiment, the system 100 is configured to provide cooling and therefore includes one or more refrigerant evaporator coils 130, typically associated with the one or more air handlers 110. Such embodiment of the system 100 also includes one or more compressors 140 and associated condenser coils 142, which are typically associated in one or more so-called "outdoor units" 144. The one or more compressors 140 and associated condenser coils 142 are typically connected to an associated evaporator coil 130 by a refrigerant line 146. In an alternative embodiment, the system 100 is configured to provide ventilation, heating and cooling, in which case the one or more air handlers 110, furnaces 120 and evaporator coils 130 are associated with one or more "indoor units" 148, e.g., basement or attic units.

For convenience in the following discussion, a demand unit 155 is representative of the various units exemplified by the air handler 110, furnace 120, and compressor 140, and more generally includes an HVAC component that provides a service in response to control by the control unit 150. The service may be, e.g., heating, cooling, or air circulation. The demand unit 155 may provide more than one service, and if so, one service may be a primary service, and another service may be an ancillary service. For example, for a cooling unit that also circulates air, the primary service may be cooling, and the ancillary service may be air circulation (e.g. by a blower).

The demand unit 155 may have a maximum service capacity associated therewith. For example, the furnace 120 may have a maximum heat output (often expressed in terms of British Thermal Units, or BTU), or a blower may have a maximum airflow capacity (often expressed in terms of cubic feet per minute, or CFM). In some cases, the addressable unit 155 may be configured to provide a primary or ancillary service in staged portions. For example, blower may have two or more motor speeds, with a CFM value associated with each motor speed.

One or more control units 150 control one or more of the one or more air handlers 110, the one or more furnaces 120 and/or the one or more compressors 140 to regulate the temperature of the premises, at least approximately. In various embodiments to be described, the one or more displays 170 provide additional functions such as operational, diagnostic and status message display and an attractive, visual interface that allows an installer, user or repairman to perform actions with respect to the system 100 more intuitively. Herein, the term "operator" will be used to refer collectively to any of the installer, the user and the repairman unless clarity is served by greater specificity.

One or more separate comfort sensors 160 may be associated with the one or more control units 150 and may also optionally be associated with one or more displays 170. The one or more comfort sensors 160 provide environmental data, e.g. temperature and/or humidity, to the one or more control units 150. An individual comfort sensor 160 may be physically located within a same enclosure or housing as the control unit 150. In such cases, the commonly housed comfort sensor 160 may be addressed independently. However, the one or more comfort sensors 160 may be located separately and physically remote from the one or more control units 150. Also, an individual control unit 150 may be physically located within a same enclosure or housing as a display 170. In such embodiments, the commonly housed control unit 150 and display 170 may each be addressed independently. However, one or more of the displays 170 may be located within the system 100 separately from and/or physically remote to the control units 150. The one or more displays 170 may include a screen such as a liquid crystal display (not shown).

Although not shown in FIG. 1, the HVAC system 100 may include one or more heat pumps in lieu of or in addition to the one or more furnaces 120, and one or more compressors 140. One or more humidifiers or dehumidifiers may be employed to increase or decrease humidity. One or more dampers may be used to modulate air flow through ducts (not shown). Air cleaners and lights may be used to reduce air pollution. Air quality sensors may be used to determine overall air quality.

Finally, a data bus 180, which in the illustrated embodiment is a serial bus, couples the one or more air handlers 110, the one or more furnaces 120, the one or more evaporator coils 130, the one or more condenser coils 142 and compressors 140, the one or more control units 150, the one or more remote comfort sensors 160 and the one or more displays 170 such that data may be communicated therebetween or thereamong. As will be understood, the data bus 180 may be advantageously employed to convey one or more alarm messages or one or more diagnostic messages.

FIG. 2 is a high-level block diagram of one embodiment of an HVAC data processing and communication network 200 that may be employed in the HVAC system 100 of FIG. 1. One or more air handler controllers ("AHCs") 210 may be associated with the one or more air handlers 110 of FIG. 1. One or more integrated furnace controllers ("IFCs") 220 may be associated with the one or more furnaces 120. One or more damper controller modules 215, also referred to as a zone controller module 215, may be associated with the one or more dampers 114 the interface the one or more dampers to the data bus 180. One or more AC controllers 225 may be associated with one or more evaporator coils 130 and one or more condenser coils 142 and compressors 140 of FIG. 1. The network 200 includes an active subnet controller ("aSC") 230a and an inactive subnet controller ("iSC") 230i. The aSC 230a is responsible for configuring and monitoring the system 100 and for implementation of heating, cooling, air quality, ventilation or any other functional algorithms therein.

Two or more aSCs 230a may also be employed to divide the network 200 into subnetworks, or subnets, simplifying network configuration, communication and control. The iSC 230i is a subnet controller that does not actively control the network 200. In some embodiments, the iSC 230i listens to all messages passed over the data bus 180, and updates its internal memory to match that of the aSC 230a. In this manner, the iSC 230i may backup parameters stored by the aSC 230a, and may be used as an active subnet controller if the aSC 230a malfunctions. Typically there is only one aSC 230a in a subnet, but there may be multiple iSCs therein, or no iSC at all. Herein, where the distinction between an active or a passive SC is not germane the subnet controller is referred to generally as an SC 230.

A user interface (UI) 240 provides a means by which an operator may communicate with the remainder of the network 200. In an alternative embodiment, a user interface/gateway (UI/G) 250 provides a means by which a remote operator or remote equipment may communicate with the remainder of the network 200. Such a remote operator or equipment is referred to generally as a remote entity. A comfort sensor interface 260 may provide an interface between the data bus 180 and each of the one or more comfort sensors 160.

Each of the components 210, 220, 225, 230a, 230i, 240, 250, 260 may include a general interface device configured to interface to the bus 180, as described below. (For ease of description any of the networked components, e.g., the components 210, 220, 225, 230a, 230i, 240, 250, 260, may be referred to generally herein as a device 290. In other words, the device 290 of FIG. 2 is a proxy for any of a furnace, a heat pump, a subnet controller, etc, and that device's associated interface means.) The data bus 180 in some embodiments is implemented using the Bosch CAN (Controller Area Network) specification, revision 2, and may be synonymously referred to herein as a residential serial bus (RSBus) 180. The data bus 180 provides communication between or among the aforementioned elements of the network 200. It should be understood that the use of the term "residential" is nonlimiting; the network 200 may be employed in any premises whatsoever, fixed or mobile. In wireless embodiments, the data bus 180 may be implemented, e.g., using Bluetooth™ or a similar wireless standard.

FIG. 9 illustrates a device 910 according to the disclosure. The following description pertains to the HVAC data processing and communication network 200 that is made up of a number of system devices 910 operating cooperatively to provide HVAC functions. Hereinafter the system device 910 is referred to more briefly as the device 910 without any loss of generality. The term "device" applies to any component of the system 100 that is configured to communicate with other components of the system 100 over a wired or wireless network. Thus, the device 910 may be, e.g., the air handler 110 in combination with its AHC 210, or the furnace 120 in combination with its IFC 220. This discussion may refer to a generic device 910 or to a device 910 with a specific recited function as appropriate. An appropriate signaling protocol may be used to govern communication of one device with another device. While the function of various devices 910 in the network 200 may differ, each device 910 shares a common architecture for interfacing with other devices, e.g. the local controller 290 appropriately configured for an HVAC component 920 with which the local controller 290 is associated. The microprocessor or state machine in the local controller 290 may operate to perform any task for which the device 910 is responsible, including, without limitation, sending and responding to messages via the data bus 180, controlling a motor or actuator, or performing calculations.

In various embodiments, signaling between devices 910 relies on messages. Messages are data strings that convey information from one device 910 to another device 910. The purpose of various substrings or bits in the messages may vary depending on the context of the message. Generally, specifics regarding message protocols are beyond the scope of the present description. However, aspects of messages and messaging are described when needed to provide context for the various embodiments described herein.

Figure 3A:
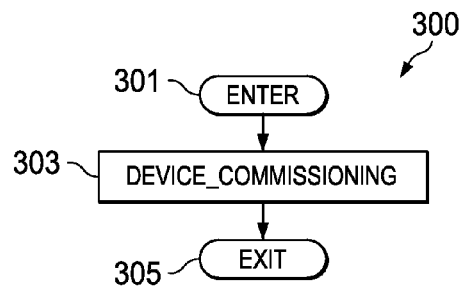
FIG. 3A is a diagram of a series of steps in an event sequence that depicts a device commissioning in an HVAC network having an active subnet controller.

Turning now to FIG. 3A, illustrated is a diagram 300 of a series of steps that occur in relation to a commissioning of the unit 155. The diagram 300 includes an enter state 301, a device commissioning state 303, and an exit state 305. The HVAC system 100 can be described as being partitioned into a plurality of subnets, each subnet controlled by its own active subnet controller 230a.

Device commissioning can generally be defined as setting operational parameters for a device in the network of the HVAC system, including its installation parameters. Generally, device commissioning 300 is used by the subnet controller 230 when it is active to: a) set operating "Installer Parameters" for a networked device, such as air handlers 110, (henceforth to be referred to collectively, for the sake of convenience, as the unit 155, although other devices are also contemplated), b) to load UI/Gs 240, 250 with names and settings of "Installer Parameters and Features" of the units 155, c) to configure replacement parts for the units 155, and d) to restore values of "Installer Parameters and Features" in units 155 if those "Parameters and Features" were lost due to memory corruption or any other event. Device commissioning is a process used in the HVAC system 100, either in a "configuration" mode or in a "verification" mode.

In the "configuration" mode, the unit 155 shares its information with the subnet controller 230a in an anticipation of being employable in the HVAC system 100, and an appropriate subnet. Generally, the commissioning process 300 provides a convenient way to change or restore functional parameters, both for the subnet controller 230a and the unit 155.

In both the "verification" mode and the "configuration" mode, the unit 155 is checked for memory errors or other configuration or programming errors. There are differences in device 260 behavior between the "configuration" mode and in the "verification" mode, to be detailed below.

The "subnet startup" mode programs the subnet controller 230 to be active. The "subnet startup" mode enables subnet communications, (i.e., communication within a subnet), and also deactivates a "link" sub-mode. A "link" mode may be generally defined as a mode that allows a number of subnets to work together on the same HVAC network 100, and that assigns subnet numbers for each subnet to allow this communication.

The "installer test" mode is employed when an installer installs and tests aspects and devices 110 of the HVAC system 100. The "normal operations" mode is an ongoing operation of units 155 of the HVAC system 100 in a normal use.

More specifically, the device commissioning state machine 300 can be employed with: a) the "configuration" mode, which is invoked when transitioning to the commissioning state from the "subnet startup mode" or "installer test" mode, or the "normal mode", or b) a "verification" mode. The "verification" mode is invoked when transitioning to the commissioning state from the "subnet startup" mode.

The following describes an illustrative embodiment of a process of commissioning 300 the HVAC unit 155, first for a "configuration" mode, and then for a "verification" mode.

The process of commissioning differs from a "subnet startup," in that commissioning requires that the network configuration, including configuration and activation of subnet controllers 230, has already been completed before the commissioning 300 of the device 260 can start. Please note that there can be more than one subnet controller 230 on a subnet, but only subnet controller 230a is active at any one time.

In one embodiment, in order to enter into the state 320 of the process 300 in the "configuration" mode, the unit 155 receives either: a) an "aSC" ('active subnet controller') Device Assignment message", having "Assigned State" bits set to "Commissioning"; or b) a receipt of an "aSC Change State" message, with "New aSC State" bits set to "Commissioning," from the active subnet controller 230. For both "configuration" and "verification" modes, an "aSC Device Assignment" message can be generally regarded as a message that assigns the unit 155 to a particular active subnet controller 230a. For both "configuration" and "verification" modes, an "aSC Change State" message can be generally regarded as a message that starts and ends employment of the commissioning state diagram 300 for the units 155 and all other devices on the subnet.

In one embodiment, in the state 320 in the configuration mode, all units 155 respond to the "aSC Device Assignment" message with their respective "Device Status" messages, indicating that the units 155 are now in commissioning process 300 due to their response to this previous message. For both "configuration" and "verification" modes, the "Device Status" message can be generally defined as message that informs the active subnet controller 230a of what actions are being taken by the unit 155 at a given time.

However, alternatively, in other embodiments, in the state 320 in the "configuration" mode, if the units 155 are instead busy, as indicated by "aSC Acknowledge" bits of the "Device Status" message sent to the subnet controller 230a set as a "Control Busy," the active subnet controller 230a will wait for the busy units 155 to clear their "aSC Acknowledge" bits before proceeding with further elements of the Commissioning 320 process. The units 155 then resend their "Device Status" messages as soon as they are no longer busy.

From this point on, all units 155 send their "Device Status" messages periodically and on any status change, both during and after the commissioning 300. If the unit 155 does not clear its "aSC Acknowledge" bits within a minute (indicating its control is no longer "busy"), the active subnet controller 230a sends an "Unresponsive Device2" alarm for each such unit 155. If in "configuration" mode, the active subnet controller 230a remains in the waiting mode indefinitely, until the unit 155 responds correctly, or the subnet is reset manually or after a timeout is reached. In "verification" mode the active subnet controller 230a proceeds further to exit the state.

In the "configuration" mode, each unit 155 remembers all of its optional sensors that are currently attached to it. Furthermore, each unit 155 may store a local copy in its non-volatile memory ("NVM") of all of any other unit features that it is dependent on. A unit 155 feature can be generally defined as any datum that is fixed and cannot be changed by the installer, serviceman or the home owner. Changing of a "Feature" value normally involves reprogramming of the units 155 firmware.

In at least some embodiments, a feature is something that is fixed value, that is hard-wired into a device. In other words, no installer or home owner can change it. Features are programmed into the unit 155 during a manufacturing or an assembly process. Features can be recovered in a home, during a Data non-volatile memory ("NVM") recovery substate of Commissioning state only—the recovery substate happens automatically and without installer or user intervention. In a further embodiment, parameters can be changed by the installers only. In a yet further embodiment, the HVAC system 100 employs "variables"—those can be changed by the installers and also the home owners.

In some embodiments, a "Parameter List" is normally a Feature that contains a special list of specific parameters included in the unit 155. Parameter values can be changed, and their state can be changed also (from enabled to disabled and vice-versa), but their presence is set once and for all in a given firmware version. Therefore, a list of Parameters (not their values) is also fixed, and is thus treated as a "Feature."

However, although elements of the "configuration" mode commissioning and "verification" mode commissioning are similar, when the active subnet controller 230 is in "verification" mode instead of in "configuration" mode, the active subnet controller 230a can exit commissioning 300 regardless of the value of the alarms of the units 155. However, alternatively, if the active subnet controller 230a is in "configuration" mode, the active subnet controller 230a will not exit from its commissioning state 300 for as long as at least one unit's 155 "aSC Acknowledge" flags are set to "Control Busy." In one embodiment of the "verification" mode, the active subnet controller 230a timeouts the installation and resets the subnet to default parameters.

In the "verification" mode, assuming the unit 155 operates with a non-corrupted (original or restored copy) NVM, each unit 155 checks any of its attached sensors to see if they match with the parameters that were present in a most recent configuration of the unit 155. In some embodiments, alarms are generated by the unit 155 for missing or malfunctioning sensors as soon as the faulty condition is detected, to be employed by the user interfaces and gateways present on the subnet to notify the installer or homeowner of the encountered problem. The unexpected absence of certain sensors may inhibit the operation of the unit 155 or the subnet. This is normally manifested by the signaling of the appropriate Service Bits in the Device Status message used by the active subnet controller 230a, to determine the operational viability or health of the subnet's systems.

In some embodiments, the device commissioning process 300 then transitions into a state 330, and then ends, upon either: a) the last unit 155 receiving all of unit 155 parameters that it is dependent on, when in "verification" mode; or b) upon a request by a user, when in "configuration" mode. The active subnet controller 230a then proceeds to ensure that no subnet unit 155 has its "aSC Acknowledge" flag set to a "Control Busy" state. The "aSC Acknowledge" flag not being set indicates that all of a non-volatile memory of a given unit 155 had been written to with the necessary parameters. If no "Control Busy" state is detected, the active subnet controller 230a then issues the "aSC Change State" message, which forces the unit 155 from a commissioning state to a non-commissioning state, in either a "configuration" or a "verification" mode.

In some embodiments, when the unit 155 in the process 300 fails its NVM data integrity check in an "NVM Check State," and the active subnet controller is unable to perform NVM Recovery, the unit 155 instead employs its default data stored in its non-volatile (Flash) memory and/or uses default calculations to initialize the data dependent on other devices in the system. The other device data to be used for commissioning could have been obtained in either the "verification" or "configuration" mode. For data or other parameters that were not transferred or generated as part of that commissioning 300 session, default values are used.

In one embodiment, upon a detection of a system configuration error, such as a missing device whose features or parameters the unit 155 depends upon, it uses the locally stored copy of the other device's features that it depends upon, and ignores any potential feature value conflicts. In another embodiment, the unit 155 uses the locally stored copy of other parameters of the unit 155 that it depends on and ignores any potential dependent parameter value conflicts. In other words, the unit 155 employs a first installed parameter as a template for a second installed parameter on a second device. In a third embodiment, the unit 155 will change its parameter or feature values only if explicitly instructed by the active subnet controller 230 or the UI/G 240, 250.

The system 100 may be configured to limit allowed configurations of units 155. For example, it may be determined that certain configurations of the system 100 are undesirable or incompatible with proper operation of the various units 155. In various embodiments the various units 155 in the subnet are assigned credentials during commissioning to operate on the subnet. The aSC 230a may be configured to ignore a request made during the commissioning state from a unit 155 outside a permitted configuration set from registering with the aSC 230a to prevent undesired or unpredictable operation that might otherwise result.

Figure 3C:
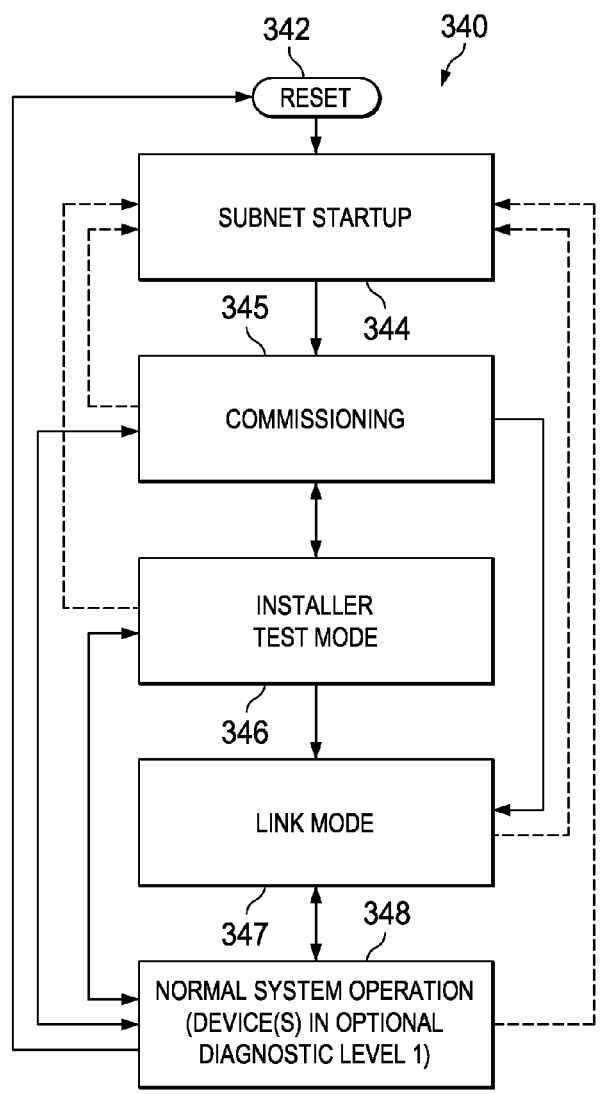
FIG. 3C is a diagram of the above series of steps of FIG. 3B to be followed by a subnet controller to synchronize with a device of the HVAC system.
Figure 3B:
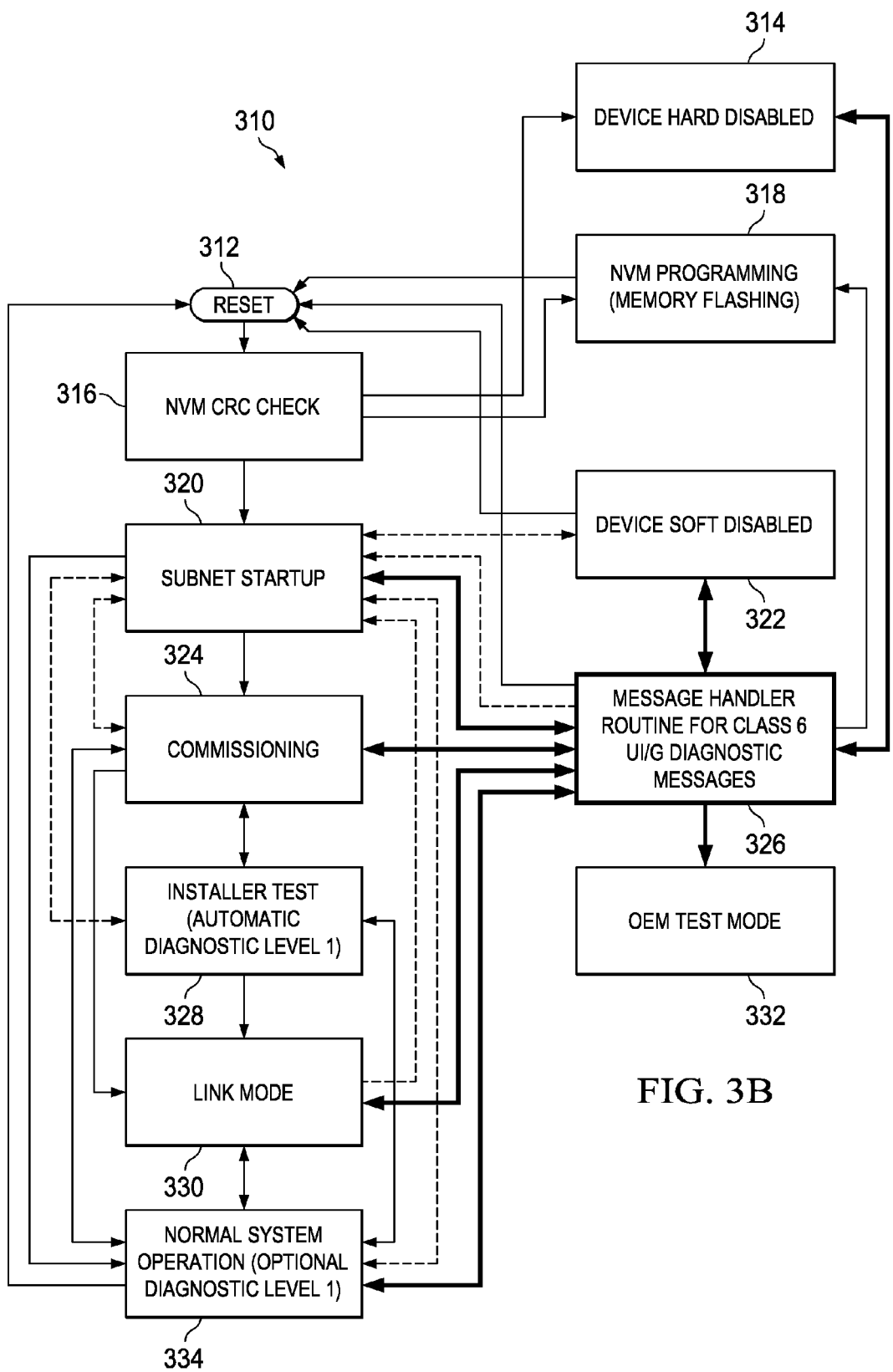
FIG. 3B is a diagram of a series of steps that occur in relation to a commissioning of a subnet including an addressable unit.

Turning now to FIG. 3B, illustrated is an HVAC device state machine 310 illustrated for a subnet, including the unit 155, in more detail. Heavy solid lines indicate normal state transitions when the subnet is transitioning from one state to another state, dashed lines indicate a subroutine call, and light solid lines indicate unexpected yet valid transitions. All states other than state 326 represent device states, and the state 326 represents a message handling routine.

As is illustrated in the present embodiment, a reset state 312 of a subnet advances to a NVM CRC check 316 for a given device (such as unit 155). If the device fails the test, the device advances to a NVM programming 318. If the device passes, however, then in subnet startup 320, the device is assigned an address (Equipment Type number) and some features and parameters of the unit 155 may be shared with the subnet. Then, in substate 324, device commissioning as described in FIG. 3A occurs. This then leads to an installer test state 328. This, in turn, then leads to a link mode startup 330, as described above. Finally, then in a step 334, normal system operation occurs, although system can reset to state 312 or be brought to states 314 or 332 via diagnostic messages handled in a state 326.

In a further embodiment, during the NVM CRC check 316, the state machine 310 can advance to a NVM programming state 318. This can occur due to such factors as a failure of a non-volatile memory, or an initial programming of the NVM. In a yet further embodiment, each of these units 155 is programmed to deal with one form of a diagnostic message regarding system errors in a state 326, and from there to testing the device 160 itself in an OEM test mode 332.

Turning now to FIG. 3C, illustrated is a state flow diagram 340 for the active subnet controller 230 in relation to the unit 155. Generally, is the responsibility of the active subnet controller 230a to implement proper state transitions. The other units 155 follow the explicit direction of the aSC 230a for all valid transactions. These state diagrams are included to help ensure that a state of the unit 155 is the same as the subnet controller. The SC 230a is responsible for device synchronization. If the unit 155 is detected out of synch with the rest of the system, the aSC 230a, in some embodiments, immediately tries to bring the unit 155 to the current system state, if possible.

If an addressable unit 155 is detected in subnet startup 342, the subnet controller 230a applies asynchronous startup rules, which generally pertain to how many parameters are to be passed between device 160 and the active subnet controller 230a.

If an addressable unit 155 is detected in commissioning 345, installer test 346, link mode 347 or normal operation 348 substates, the unit 155, in some embodiments, is brought to the current state via a resend of an "aSC Change State" message, which involves transitioning from a first current aSC state to a second current aSC state.

In some embodiments, if a unit 155 is detected in OEM Test or Soft Disabled state, the unit 155 shall be reset by the active subnet controller 230a in a step 342. If a unit 155 is detected in "Hard Disabled" or "NVM Programming" state, the active subnet controller 230a assumes that it is not available on the subnet In a further embodiment, inactive subnet controllers 230i are required to keep the most up to date subnet and HVAC system configuration information. Inactive subnet controllers 230i listen to all UI/G and aSC messages and continuously update their non-volatile memory to attempt to be as consistent as possible with the settings stored in active subnet controller 230a.

Various Aspects of Updating Variable Parameters in Communicating and Non-Communicating Devices There are various approaches to updating parameters within addressable units 155, which will first be introduced, and discussed in more detail below.

a) retrieving both fixed and non-fixed parameters from the device 155 of the HVAC network 100, and allowing a user to update the non-fixed parameters of the HVAC network 100, such as described regarding FIG. 4B, below;

b) updating parameters when the updated values of one set of variable parameters within the HVAC addressable unit 155 are dependent upon the values of another parameter within the same device, such as described regarding FIG. 4C, below.

c) updating parameters of a second non-communicating device when the value of a non-communicating device is updated by a communicating device with the employment of "non-communicating parameters," such as is described regarding FIG. 5, below. In other words, a list of variable parameters, itself a feature, is used to update the non-communicating device;

d) updating parameters of first unit 155 when a first device depending upon the features (non-changing parameters) of the second unit 155, such as is described regarding FIG. 6, below. For example, the unit's parameter value depends on the other device's feature value. For example the default "High Cooling CFM" setting is calculated and its possible range is adjusted based on the tonnage of the outdoor unit. So, if the outdoor unit's tonnage is 4 ton than the High Cooling CFM is limited to range 1400 to 1600 (3.5*OU tonnage to 4*OU tonnage).

e) when a change of a variable parameter of a first device is dependent upon a change of a variable parameter of a second device, and this change gets propagated through an HVAC system, such as discussed regarding FIGS. 7A and 7B, below. For example, a value of sensor "zone number" parameter may be dependent on the value of "total number of zones" parameter, so that one sensor is not mistakenly assigned to a zone number that does not exist.

Figure 4A:
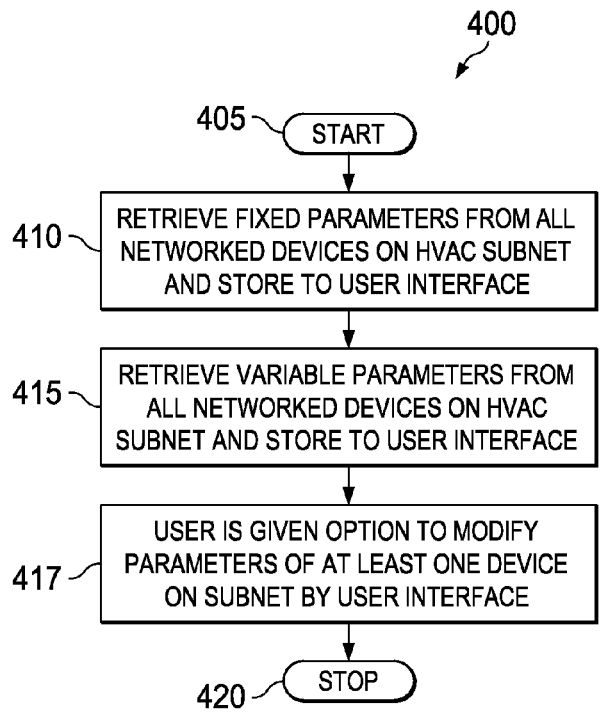
FIG. 4A is an illustration of method flow of a first approach directed towards a parameter configuration in a communicating HVAC network.

Turning now to FIG. 4A, illustrated is an exemplary method 400 for updating variable device parameters within devices of the HVAC network 200 of the HVAC system 100. This flow generally applies to subsection "a", above. For ease of explanation, addressable units 155 may be interchangeably referred to as "devices" for the rest of this document. After a start step 402, in a step 410, all fixed parameters are retrieved from all networked devices on an HVAC subnet, and these variable parameter values are stored to a user interface, such as user interface 240. In a step 415, in some embodiments, all variable parameters are retrieved from all networked devices on the HVAC subnet and are stored in the user interface. In a step 417, a user is given an option by the user interface to modify a value of a variable parameter of at least one networked device of the subnet.

Turning now to FIGS. 4Bi and 4Bii, illustrated is an exemplary flow diagram for a method 425, such as may be employed with the above commissioning steps of the subnet 400, that updates parameters within an HVAC device that are dependent upon other parameters that are stored or updated within that same device. This can relate to situation "b", described above.

In the exemplary method 425, after a start step 430, in a step 435, a UIG (either a user interface or a gateway that can include a user interface) sends a device parameter value change message to a device, such as the addressable unit 155, with an updated value of an installer parameter.

In one embodiment, in a step 440, an HVAC networked device determines whether a parameter definition, received from the UIG 405, has changed. An example of a changed parameter definition would be a change of a flag from enabled to disabled for a given networked device. If the parameter definition has not changed, the method advances to step 455. If the parameter definition has changed, in a step 445, the device sends a "Device UIG Parameter Definition by Number" message to the UIG 405 that contains the new parameter definition. Then in step 450, the device sends a "Device UIG Parameter Value by Number" message containing the parameter value and its flags for all other affected parameters in the same group. For example, if a comfort level parameter were changed, this could affect a humidity range that is allowable, and a work schedule for the networked HVAC device, all of which could be related parameters within the same device.

In an exemplary further embodiment, an enable/disable flag indicates if a parameter is currently applicable based on values of the other parameters within the device. After a "UI/G DEVICE Parameter Value Change" is received, the IFC 220 will send parameter value messages for every parameter that changed its enabled/disabled status due to that parameter value change. After those messages are transmitted, the IFC 220 sends an appropriate acknowledge message to confirm the parameter value update.

In a step 455, it can be determined by the networked HVAC device, such as the device 910, whether a parameter update is within an allowed range. If the parameter update is within an allowed range, the networked HVAC device updates its own internal memory to include a copy of the updated parameter that was found to be within range by the networked HVAC device in a step 460. If the parameter update is not within the allowed range, the HVAC networked device keeps its previous parameter value in a step 465.

In a step 470, the networked HVAC device, such as the device 910, can send the UIG the parameter value now stored within in the device, which can be either the updated parameter value or the previous parameter value, as determined in the step 455. In a step 475, the UIG relays all changed parameters to an active subnet controller, such as the active subnet controller 415. In a step 480, the active subnet controller updates its stored backup parameter values and acknowledges all changed parameters that were forwarded from the UIG, such as the UIG 405.

In a step 485, the UIG can relay all of the changed parameter values received from the networked HVAC device, such as the device 910, to other HVAC devices (not illustrated) on the subnet that have registered a parameter dependency that matches a changed parameter of the device 910. This registration process can occur when the active subnet controller had previously forwarded to the UIG an "aSC Device Found Devices List Parameters" received in a "parameter scan" state of the active subnet controller during an activation sequence of the active subnet controller.

In a step 490, the UIG determines whether all of any other HVAC networked devices on the subnet have updated their parameters that depend upon the updated parameter and acknowledged such. If it is determined a given networked HVAC device has not acknowledged its updated parameters, the exemplary method 400 can loop back to step 435, and has that device go through the method 425 for its new parameter. If it is determined that all other devices have updated the appropriate parameters, then the method stops in a step 490.

Turning now to FIG. 5, illustrated is an exemplary flow for a method 500 for commissioning a networked HVAC device that is a non-communicating device. This corresponds to situation "c", described above, wherein a communicating device commissions a non-communicating device. Generally, in the method 500, a communicating device can mimic a non-communicating device so that the installer programs the communicating device in lieu of the non-communicating device. The communicating HVAC device then programs non-communicating HVAC device through use of a feature set of definitions of variable parameters that are programmed within the first device.

Generally, the exemplary method 500 can allow a communicating device, defined as an HVAC device that can directly communicate with an installer, the communicating device often being an indoor HVAC device, to set its own internal parameters and to also operate with another HVAC device that is either communicating or non-communicating device of a same type, i.e., a device that can not directly communicate with an installer. The non-communicating device can be an outdoor device, although not all outdoor devices are non-communicating units. Generally, information about non-communicating equipment is stored as fixed parameter types in a feature manifest in the various communicating units 155, e.g. indoor units that can program this non-communicating equipment, e.g. outdoor units.

In one embodiment, before entering into the method 500, if during a "feature manifest communication" in the configuration process of the commissioning 300, if the IFC 220 did not recognize a presence of a communicating outdoor unit, such as a communicating Humidifier or Dehumidifier, as opposed to a non-communicating device, the IFC 220 will enable its own non-communicating parameters for those missing devices. These parameters, although they represent variables, the types of parameters are fixed and part of the feature manifest. When requested by the active subnet controller 230, the IFC 220 sends all "non-communicating parameters" with enabled/disabled flag based on the communicating feature manifest of the other communicating devices on the subnet.

Generally, default parameter values for non-communicating and installer parameters are then loaded into the non-volatile memory of the communicating devices 110 on first entry in configuration (commissioning state, such as discussed in the state diagram 300, above), and also when diagnostic inquiry command "Set Default Installer Parameter Values" is executed.

In the exemplary method 500, after a start step 510, a communicating HVAC device checks for both a communicating and a non-communicating device of a sake kind in a step 515, such as through employment of a "Non_Comm_Check_Scan State" enquiry. A goal of a "Non_Comm_Check_Scan State" is to inquire of an installer or the subnet controller 230, which is an active subnet controller, what non-communicating equipment there is attached to the communicating devices.

In a step 520, it can be determined whether a found device on a HVAC subnet during a manifest check is a non-communicating device or a communicating device. If the found device is a communicating device, the method 500 advances to a stop step 530. However, if the found device is not a communicating device, in a step 525, the communicating device allows an installer to program the non-communicating device, through a programming of known fixed-type parameters, the parameter types are stored in the communicating device as part of the feature manifest. The communicating unit 155 then conveying the fixed type but variable value parameters to the non-communicating device. The internal features of the non-communicating device typically mimic features of a communicating device when being installed by an installer.

In one embodiment of the method 500, the information about non-communicating equipment is stored as parameter types in the devices that directly control this equipment, e.g., indoor units, which would therefore be communicating devices. The process of configuring the non-communicating equipment can be equivalent to updating parameter values. This state is optional and it is only entered when in configuration mode.

For example, with the non-communicating parameter "Non-communicating Outdoor Unit" initially at default value (0=no non-communicating outdoor unit attached to the IFC), both the "Non-communicating Outdoor unit capacity" and the "Minimum non-communicating outdoor unit capacity" are disabled (not applicable) parameters. If the "Non-communicating Outdoor Unit" is changed to "2 stage A/C" unit, both parameters will become enabled (applicable) and the IFC 220 will send "Device Parameter Value By Number" messages with the enabled bit set for both parameters followed by the message to confirm the "Non-communicating Outdoor Unit" parameter change. This is applicable for all IFC parameters within a same group/list. The IFC 220 stores the non-communicating parameter values in non-volatile memory and protects them with a checksum. These values can then be employed by the networked HVAC device.

The above example employs device parameter dependencies using the non-communicating parameters. Non-communicating parameters can also be dependent on one another.

Turning now to FIG. 6A, illustrated is an exemplary flow of a method 600 for commissioning the parameters of the addressable unit 155 wherein its own internal parameters when parameter validity of the networked HVAC unit 155 depend upon network configuration and/or other device manifest features of a second device. This generally corresponds to situation "d", discussed above.

Various device internal parameters are configured differently, depending upon other feature parameter values (i.e., permanent) components of the network 200 of the HVAC system 100. In a further embodiment, the method 600 allows for one device to set its own internal parameters and operating modes, based on information published by other devices 110 on the subnet, without an involvement of the active subnet controller 230a.

An example of commissioning parameters when internal parameters and parameter validity depend upon network configuration and/or other device features of a second network device is programming an indoor unit blower having a cubic feet per minute (CFM) speed for outdoor units having various numbers of heating or cooling stages. During the commissioning process 300, the unit 155 listens to an "outdoor unit feature manifest" and then sets its own internal parameter values as well as parameter validity, i.e., whether the parameter is enabled or disabled. An "outdoor unit feature manifest" can be generally defined as a manifest of parameter types of outdoor units for a subnet, and their parameter values. Indoor units can calculate default values, such as whether a given parameter setting is applicable for the unit 155 of the HVAC system 100 for HVAC network 200 operation or not, and send the information to the installer. For example, setting a "Low Cooling CFM" for a 1-stage outdoor unit 155 is not applicable. Similarly, the indoor unit 155 can monitor for the presence of other accessories such as a "Humidifier" and "Dehumidifier," and set its own internal parameters as determined by these devices, as well.

In the exemplary method 600, after a start step 610, a plurality of devices, one of which can be an indoor device, enters the commissioning process 300. In a step 620, the device reads a feature manifest of the second device, which is a listing of what permanent features are available and disclosed to the device. In a step 625, the first device sets its own parameter validity as determined by an element of the outdoor feature manifest. In a step 630, the first device 155 sets its own internal parameter value as determined by the outdoor feature manifest.

In a step 635, the first unit 155 informs an installer on the validity and value of the set parameter. In a step 640, it is determined if there is yet another HVAC device on the subnet. This can be determined by finding indicia of another outside device in the outdoor feature manifest. If there is another device, then the method loops back to step 615, and the device looks at parameters of yet another device, and uses the parameters of the yet another device to set its own parameters, and again transitions through the method 600. If there is not another device, the method 600 stops in a step 645.

Turning briefly now to FIG. 6B, illustrated is an exemplary overview of a messaging flow messages implemented in a commissioning state between the subnet controller 230*a*, the UIG 250, and the unit 155, and includes messages in the beginning and an end of the state. For example, FIG. 6B illustrates both the "Device Status" message and the "GUI Status state" discussed above.

Turning briefly now to FIG. 6C1, illustrated are exemplary communication flows for a "non-communicating check scan and parameter scan" message flow. As is illustrated, various messages, such as a "Device Dependent Parameter List" and corresponding definitions are provided. This flow can be employed in conjunction with the method 600.

Turning briefly now to FIG. 6C2, illustrated is an exemplary "Non-Communicating Check Update and Parameter Update" message flow. As a plurality of devices 110 are disclosed as having their parameters modified, such as by the "Device UI/G Parameter Value By Number" message to a first unit 155 and the device 2 110. This flow can also be employed by the method 600.

Turning now to FIG. 7A1, illustrated is an exemplary method 700 for updating and propagating a value of an internal parameter of a first device when the value is dependent upon a second device. After a step start 710, in a step 720, devices on a subnet of the HVAC 100 enter into the commissioning process. In a step 730, each device publishes its own variable parameter values. In a step 735, the ASC 230*a* asks all devices whether they have read various variable parameters, such as all necessary variable parameters. If all devices have read all variable parameters, the flow stops in a step 745. However, if they have not, the in step 740, the ASC commands the devices having the needed variable value information to republish all necessary parameters in a step 740, and the method again asks all devices in the step 735.

Turning now to FIG. 7A2, illustrated is a method 750 for updating variable parameter values in an HVAC network 200 through employment of a user interface, such as user interface 240. After a start step 752, in a step 754, a user interface asks each device for a list of dependent parameters.

In a step 756, it is determined whether a user has modified a value of a variable parameter of a first device of the HVAC network from which a second device depends? If no, then the method ends in a stop step 768. However, if yes, then in a step 758, the second device updates and confirms acceptance of the new parameter value to user interface.

In a step 758, the user interface conveys the modified parameter value to the second device employing the variable parameter. In a step 760, the user interface conveys the modified parameter to the second device employing the variable parameter.

In a step 762, it is determined whether a selected device, which can be a third device, a fourth device, and so on, has a variable parameter within it from which a yet still further device depends, which can be a fifth device, a sixth device, and so on. If not, the method ends in a step 768. However, if yes, in a step 764, the selected device updates and confirms acceptance of the new parameter value to the user interface. In a step 766, a user interface conveys modified parameter values to the further device that employs the variable parameter. In one embodiment of the flow 700, the method ends in the stop step 768. In another embodiment, the flow loops back to step 762.

Turning now to FIG. 7B, illustrated is an exemplary high level block diagram of commissioning steps of an embodiment of a subnet 770 including a user interface or gateway ("UIG") 775 coupled to a device 780, which can be the unit 155, and an active subnet controller 785. These commissioning steps can be used with method 700, which corresponds to situation described above.

In one embodiment, the active subnet controller 785 enters the commissioning state when an installer interacts with a given device 780 and updates its "Installer Parameters" in a configuration mode. The active subnet controller 785 can also verify in a verify mode.

In FIG. 7B, in state transition "1)," the UIG 775 sends a "UI/G Device Parameter Value Change" message with a new value of an installer parameter "A." The device 780 updates the value of the requested parameter "A," if possible. This can correspond to step 720 of the flow 700.

In an optional state transition "2)," after updating, the device 780 responds with a "Device UI/G Parameter Number Definition By Number message" if the definition of the parameter was changed. The unit 155 further responds with a "Device UI/G Parameter Value By Number" message for each other parameter that was affected by the new value of "A," as long as these newly updated parameters are within the same group, either a non-communicating scan or parameter scan. This can correspond to a step 730 of the flow 700.

A "non-communicating group" can be generally defined as a group of parameters that pertain to a device that can not be directly updated by an installer, but instead by another device 780 or active subnet controller 785. A "parameter group" in this context can be generally defined as a group of parameters that can be directly altered by an installer.

In state transition "3)," the device 780 responds with a "Device UI/G Parameter Value By Number" message for parameter "A." This message includes the following: parameter number, current value of the parameter, its enable and structure change flags. If the requested parameter change (for the parameter "A") is outside an acceptable range, the device 780 responds to the UI/G 775 with an unchanged value, i.e., the current value of parameter "A" stored in the device 780, in the "Device UI/G Parameter Value By Number" message. In any event, upon receipt of this message, the UIG 775 can update all changed installer parameters with their new values. This can also correlate to step 730.

In a state transition "4)," the UIG 405 then relays all changed installer parameters to the ASC 415. In a state transition "5)," the ASC 415 acknowledges to the UIG 405 all changed installer parameters. This can correlate to the step 735.

In a further state transition (not illustrated), the UIG 405 then relays the new installer parameter values to other devices 910 (FIG. 9) that have registered any of the installer parameters just changed in their "Device Dependent Parameters List" messages sent to the UIG 405 in previous "Parameter Scan" state. This continues until all updates are made with all devices by all devices that depend upon these changed parameters, and acknowledged by them. The UIG 405 keeps track of all device features and parameters for all devices 910 on the subnet based on the information previously forwarded to it, in the preceding commissioning state substates, by the active subnet controller 415. This can also collate to the step 735 and the step 740.

One employment of the state diagram illustrated in the diagram of FIG. 7B is directed towards allowing a configuration of parameters of the device 910 that are in turn, themselves dependent upon other values within the device 780. In a further embodiment, a plurality of other devices 780 having parameters are updated as a result of updating this device 780.

For example, the IFC 220, in conjunction with the UIG 405, for setting Gas Heating Airflow device dependent parameters. The IFC parameters "Low Heating Airflow," "High Heating Airflow," "Low Discharge Air Temperature" and "High Discharge Air Temperature" are dependent on the value of the IFC parameter "Heating Airflow Control Type" ("HACT" parameter). "Low Heating Airflow" and "High Heating Airflow" dependent parameters are enabled, and thus shown to the installer when the "HACT" param=0. However, if the "HACT" param=1, the last two parameters are enabled and shown to the installer. The installer modifies the parameters seen by him or her on the UIG, but not the unseen parameters Turning now to FIG. 8A, illustrated is an exemplary method flow 800 regarding controlling dependent parameters when a parameter of a first device is dependent upon a parameter of a second device of a subnet of an HVAC system, as initiated in system state machine, primarily in the subnet controller. After an enter step 802, in a step 804, it is determined whether a subnet controller is in configuration mode. If it is, then in step 806, variable parameters are propagated, such as discussed in flow 700. The method 800 then advances to step 808, wherein it is determined whether any device has non-volatile memory (NVM) corrupted. If yes, then a NVM backup data routine is initiated in a step 810. In a step 812, it is again determined whether the subnet controller is in configuration mode.

If not, then in a step 826, either a full or abbreviated feature manifest is generated by the device at the behest of the subnet controller. In a step 828, a non-communicating parameter scan is generated by the subnet controller for a given device. Then in a step 830, a full or abbreviated parameter scan is generated within the device 130, and the method ends in a step 832.

Alternatively, in a step 814, if the state of the subnet is in configuration mode, in a step 814, a replacement check for all devices is performed. In a step 816, a full feature manifest is then performed on the various HVAC devices. In a step 828, a non-communicating parameter scan is generated by the subnet controller for a given device. Then in a step 822, a full or abbreviated parameter scan is generated within the device 130, and the method ends in a step 832. Then, in a step 824, a parameter update, such as described in FIGS. 5-7B, is performed.

Turning now to FIG. 8B, illustrated is a FIG. 8B illustrates an exemplary signal flow associated with a "Replacement Check Message Flow" sub-states of commissioning state in an HVAC network.

Those skilled in the art to which this application relates will appreciate that other and further additions, deletions, substitutions and modifications may be made to the described embodiments.

What is claimed is:

1. A method for commissioning a first device that can communicate with a second device in a HVAC network, comprising:
   entering a commissioning process by said first device of a subnet of said HVAC network;
   said first device reading a feature manifest of a second device;
   said first device setting a parameter validity, as determined by said feature manifest;
   said first device setting an internal parameter value of said first device as determined by said feature manifest; and
   informing an installer on validity and value of said parameter.

2. The method of claim 1, further comprising:
   determining if there is a second device on said subnet of said HVAC;
   setting internal parameters having a value regarding said second device by said first device; and
   conveying said value to said second device from said first device.

3. The method of claim 1, wherein said first device is a subnet controller capable of being configured to operate as a selectable one of an active subnet controller and an inactive subnet controller, and wherein said first device is configured to operate as said inactive subnet controller.

4. The method of claim 1, wherein a validity of said internal parameter is determined by whether said internal parameter is enabled or disabled.

5. The method of claim 1, wherein said first device is not commissioned in the event said feature manifest is outside a permitted configuration set.

6. An HVAC system, comprising:
   a first device of said HVAC system;
   a second device of said HVAC system;
   a subnet of said HVAC system coupled to said first device and said second device;
   an outdoor feature manifest readable by said first device after said first device enters a commissioning process;
   a parameter validity indicia as determined by said outdoor feature manifest by said first device;
   an internal parameter value of said first device; and
   an output employable to convey to an installer:
   a) said parameter validity indicia, and
   b) said value of said internal parameter.

7. The system of claim 6, wherein said first device is further configured to:
   determine if there is a second device on said subnet of said HVAC;
   set internal parameters having a value regarding said second device by said first device; and convey said value to said second device from said first device.

8. The system of claim 6, wherein said first device is a subnet controller capable of being configured to operate as a selectable one of an active subnet controller and an inactive subnet controller, and wherein said first device is configured to operate as said inactive subnet controller.

9. The system of claim 6, wherein a validity of said internal parameter is determined by whether said internal parameter is enabled or disabled.

10. The system of claim 6, wherein said value to be conveyed to said installer is a default value.

11. The system of claim 6,
wherein said first device is a communicating device capable of determining if said second device is a communicating device, and
wherein, in the event that said second device is a non-communicating device, said communicating device can allow an installer to set internal parameters for said non-communicating device.

12. The system of claim 6, wherein said second device communicates through said first device during an installation instead of directly with an installer.

13. The system of claim 11, wherein said communicating device can convey said parameters to said non-communicating device after said installer sets said internal parameters into said communicating device.

14. The system of claim 6, wherein said first device and said second device are coupled to a subnet of said HVAC system, and further comprising a subnet controller coupled to said subnet and configured to control operation of said subnet to implement a heating, cooling, air quality or ventilation algorithm.

* * * * *